(12) United States Patent
Tomioka et al.

(10) Patent No.: US 11,400,598 B2
(45) Date of Patent: Aug. 2, 2022

(54) INFORMATION PROCESSING APPARATUS, METHOD, AND ROBOT SYSTEM

(71) Applicant: CANON KABUSHIKI KAISHA, Tokyo (JP)

(72) Inventors: Makoto Tomioka, Kawasaki (JP); Kazuhiko Kobayashi, Yokohama (JP); Tomoaki Higo, Kawasaki (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 16/148,792

(22) Filed: Oct. 1, 2018

(65) Prior Publication Data

US 2019/0099891 A1 Apr. 4, 2019

(30) Foreign Application Priority Data

Oct. 2, 2017 (JP) .............................. JP2017-192626

(51) Int. Cl.
*B25J 9/16* (2006.01)

(52) U.S. Cl.
CPC ........... *B25J 9/1697* (2013.01); *B25J 9/1664* (2013.01)

(58) Field of Classification Search
CPC .................. B25J 9/1697; B25J 9/1664; G05B 2219/45056
See application file for complete search history.

(56) References Cited

U.S. PATENT DOCUMENTS

| | | | | |
|---|---|---|---|---|
| 5,521,843 A | * | 5/1996 | Hashima | B25J 9/1697 340/815.54 |
| 8,774,504 B1 | * | 7/2014 | Sundareswara | G06K 9/4652 382/165 |
| 9,102,055 B1 | * | 8/2015 | Konolige | B25J 9/1671 |
| 2013/0245828 A1 | * | 9/2013 | Tateno | G06T 7/75 700/259 |
| 2015/0010202 A1 | * | 1/2015 | Tuzel | G06T 7/75 382/103 |
| 2017/0372466 A1 | * | 12/2017 | Hirota | G06T 7/75 |

FOREIGN PATENT DOCUMENTS

JP       2000-288974 A       10/2000

* cited by examiner

*Primary Examiner* — Rachid Bendidi
(74) *Attorney, Agent, or Firm* — Canon U.S.A., Inc. IP Division

(57) ABSTRACT

An information processing apparatus that obtains, with high accuracy, the gripping position for gripping the target object by a gripping apparatus is provided. The information processing apparatus includes an image acquisition unit that acquires a captured image obtained by capturing an image of the target object, an image feature detection unit that detects a plurality of image features in the captured image, and a unit detection unit that detects a unit of a pattern in which a plurality of image features repeatedly appear. In addition, the information processing apparatus further includes a snipping position determining unit that determines a gripping position using the unit detected by the unit detection unit.

10 Claims, 17 Drawing Sheets

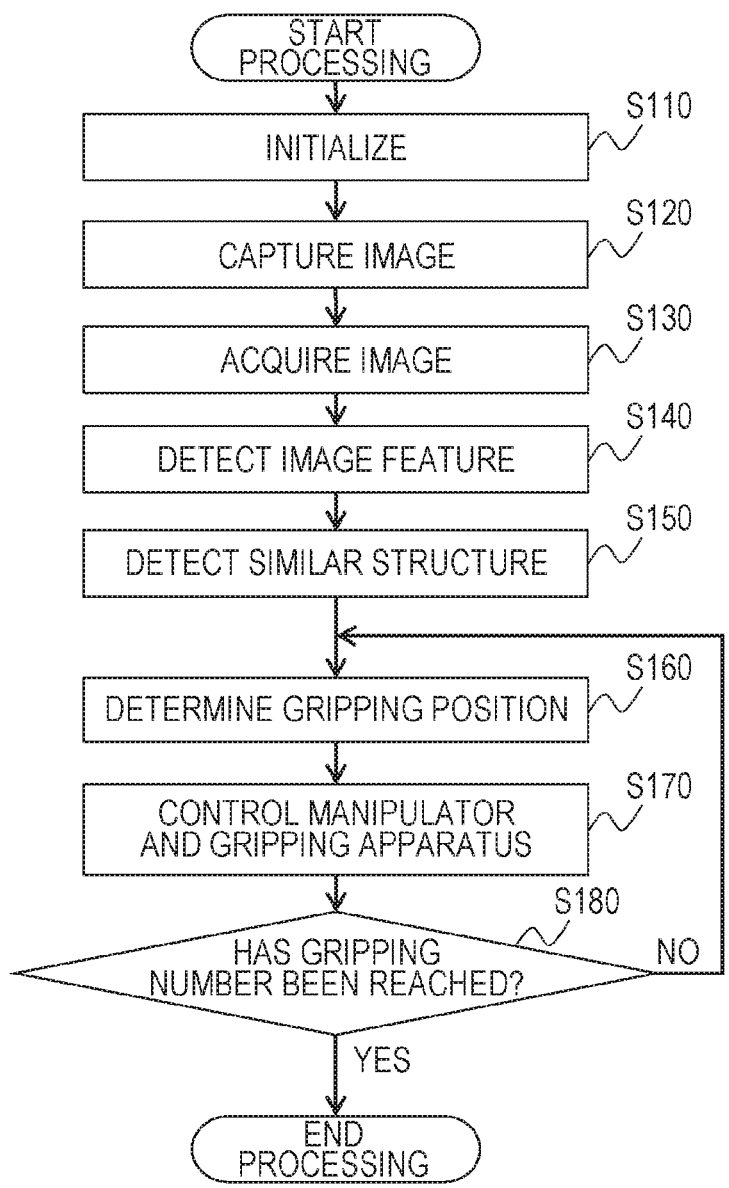

INFORMATION PROCESSING APPARATUS, METHOD, AND ROBOT SYSTEM

BACKGROUND

Field

The present disclosure relates to an information processing apparatus, a method, and a system for obtaining a gripping position when a gripping apparatus grips a target object.

Description of the Related Art

For gripping a target object using a robot, it is necessary to obtain a gripping position at which a target object can be gripped normally when the target objects are randomly piled up.

For that purpose, there is known a method of obtaining the gripping position of the target object from the image information obtained by capturing an image of the target object. As a method of obtaining the gripping position, a method of estimating a gripping position at which the robot grips the object by using teaching model data from image information obtained by three-dimensionally measuring the target object is known.

Japanese Patent Laid-open No. 2000-288974 discloses a technique in which teaching model data is generated before gripping a target object and the position and orientation of the target object is estimated from information on an image including the target object measured three-dimensionally by using the teaching model data of the target object. In this technique, the gripping position is estimated using the teaching model, but a technique for obtaining the gripping position of the target object without using the teaching model is also known.

In the case of using the teaching model, the accuracy in the estimation of the gripping position can be enhanced, but it takes a long time to prepare the teaching model and to preprocess data for estimating the gripping position, and the like. For example, in Japanese Patent Laid-Open No. 2000-288974, it takes a long time to prepare before work, and when the target object is changed, a teaching model needs to be newly generated accordingly.

Also, in the method of estimating the gripping position without using the teaching model, time is not spent to generate the teaching model, but increase of the estimation accuracy of the gripping position is difficult.

SUMMARY

The present disclosure provides a technique for quickly and highly accurately obtaining the gripping position when a target object is gripped by a robot or the like.

In one embodiment, an information processing apparatus for obtaining a gripping position for gripping a target object by a gripping apparatus is provided. The information processing apparatus includes an image acquisition unit configured to acquire a captured image obtained by capturing an image of the target object and an image feature detection unit configured to detect a plurality of image features in the captured image. A unit detection unit is provided and is configured to detect a unit of an image feature group which has a pattern in which the plurality of image features repeatedly appear and a gripping position determining unit is configured to determine the gripping position using the unit detected by the unit detection unit.

Further features will become apparent from the following description of exemplary embodiments (with reference to the attached drawings).

BRIEF DESCRIPTION OF THE DRAWINGS

FIG. 4 is a flowchart showing a processing executed in the robot system.

DESCRIPTION OF THE EMBODIMENTS

Figure 1:
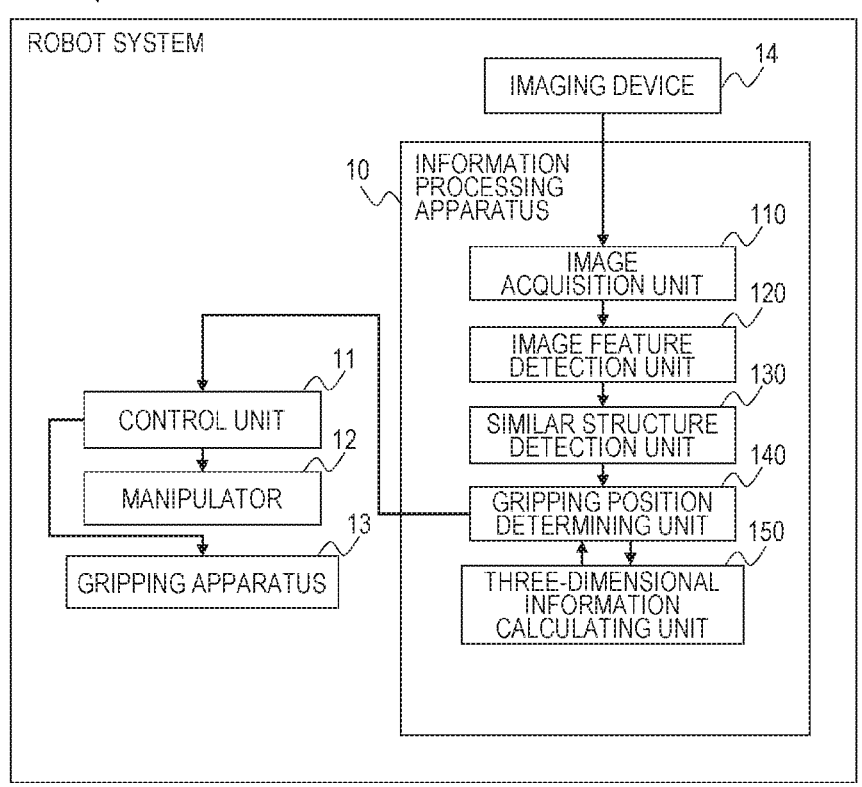
FIG. 1 is a functional block diagram of a robot system.

Hereinafter, embodiments for carrying out the present disclosure will be described with reference to the drawings.

First Embodiment

In the first embodiment, a case where a robot grips (or picks) a target object which is a target of the gripping without using a teaching model in an environment where a plurality of identical objects is arranged in alignment will be described. In the first embodiment, the target object is an object to be gripped by the robot, and includes a box-shaped product, for example. The alignment means that target objects are arranged in the same direction without gaps.

It is assumed that the robot is composed of a gripping apparatus for gripping the target object and a manipulator for moving the gripping apparatus. In the first embodiment, the gripping apparatus is a suction hand that captures a target object by air pressure, and the gripping position is a position where the object is captured by a suction hand. In addition, it is assumed that an imaging device for capturing an image of the target object is mounted on the manipulator, and by moving the manipulator, the gripping apparatus and the imaging device can be moved.

Further, the robot is provided with an information processing apparatus that performs processing such as image feature detection and the like on an image acquired from the imaging device, and a control unit that controls the manipulator and the gripping apparatus based on the processing result obtained from the information processing apparatus. Further, the information processing apparatus is not necessarily provided in the robot system itself. For example, a configuration can also be adopted in which processing such as image feature detection described above is performed by a computer connected to the imaging device and the control unit wirelessly or by wire, and the processing result is input to the control unit.

In order for the robot to grip the target object, the gripping position needs to be determined. Therefore, in the first embodiment, a plurality of image features are detected from the image captured by the imaging device provided in the robot, and the gripping position is calculated from the plurality of detected image features. In the first embodiment, two-dimensional feature points are used as image features. Here, the "feature point" is a point indicating a geometric structure such as a corner in the image.

Next, the detected feature points are clustered into a plurality of image feature groups having similar structures with respect to feature points. Each one of the structures made by clustering is called a unit. In the present specification, as to the image features, the stale of structure in which the structures and the relationships with respect to the arrangement and the feature amount of image features are similar is described as "similar structure". The similar structure in the first embodiment means a similar structure in which the relative-position relationship of image features repeatedly appears. In addition, a plurality of image feature groups having similar structures mean sets of image features clustered such that the relative-position relationships of image features included in respective sets of image features after clustering are similar. Then, where to perform gripping tier the robot is calculated based on the clustered image feature groups. In the first embodiment, the gravity center position of each image feature group is set as a gripping position.

FIG. 1 is a functional block diagram of a robot system 1 including an information processing apparatus 10 according to the first embodiment. The information processing apparatus 10 includes an image acquisition unit 110, an image feature detection unit 120, a similar structure (unit) detection unit 130, a gripping position determining unit 140, and a three-dimensional information calculating unit 150. The information processing apparatus 10 is connected to an imaging device 14 and a control unit 11 mounted on the robot. The control unit 11 is connected to a manipulator 12 and a gripping apparatus 13 and controls these units. However, FIG. 1 is an example of a device configuration and does not limit the scope of application of the present disclosure.

The image acquisition unit 110 acquires image data of a two-dimensional image including the target object whose image is captured by the imaging device 14, and outputs the acquired image data to the image feature detection unit 120.

The image feature detection unit 120 detects feature points by performing feature detection processing on the input image input from the image acquisition unit 110 and outputs the feature points to the similar structure (unit) detection unit 130. The similar structure detection unit 130 detects similar structures from the feature points detected by the image feature detection unit 120 and outputs the similar structures to the gripping position determining unit 140.

The gripping position determining unit 140 calculates a two-dimensional position at which the robot should grip the target object in the input image from the similar structures detected by the similar structure (unit) detection unit 130, and outputs the two-dimensional position to the control unit 11. The three-dimensional information calculating unit 150 calculates the three-dimensional position of the gripping position from the two-dimensional position input from the gripping position determining unit 140, and determines the position and orientation of the manipulator 12 to be input to the gripping position determining unit 140. Accordingly, the gripping position determining unit 140 also inputs the three-dimensional position and the position and orientation of the manipulator 12 to the control unit 11. In FIG. 1, the three-dimensional information calculating unit 150 is provided separately from the gripping position determining unit 140, but the gripping position determining unit 140 may have the function of the three-dimensional information calculating unit 150.

Figure 2:
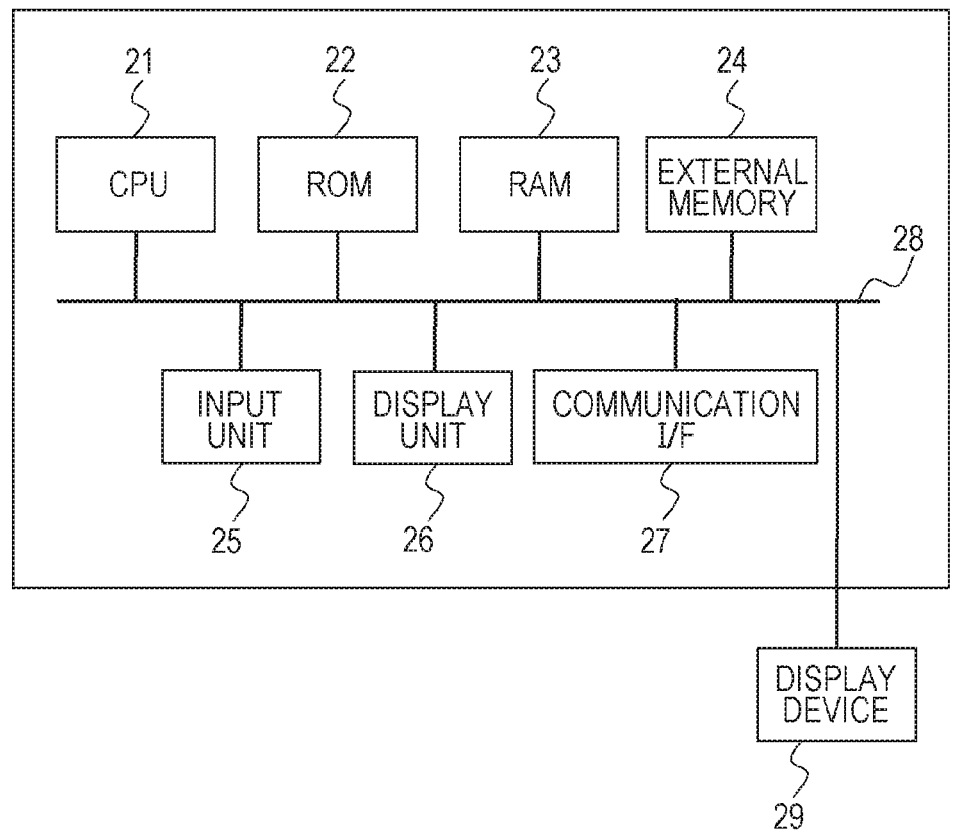
FIG. 2 is a hardware configuration diagram of an information processing apparatus.

FIG. 2 is a diagram showing a hardware configuration of the information processing apparatus 10. A central processing unit (CPU) 21 controls various devices connected to a system bus 28. A read only memory (ROW) 22 stores a basic input output system (BIOS) program and a boot program. A random access memory (RAM) 23 is used as a main storage device of the CPU 21. An external memory 24 stores programs necessary for information processing executed by the information processing apparatus 10 and control of various devices.

The CPU 21 develops, in the RAM 23, the program recorded in the ROM 22 and constructs the image acquisition unit 110, image feature detection unit 120, similar structure detection unit 130, and gripping position determining unit 140 described in FIG. 1 as software. An input unit 25 is composed of a keyboard, a mouse, and a robot controller, and performs input processing of information and the like front the user. A display unit 26 performs display control for displaying the calculation result of the information processing in the information processing apparatus 10 and other necessary information on a display device 29 according to an instruction from the CPU 21.

Note that any display device such as a liquid crystal display device, a projector, a light emitting diode (LED) indicator, or the like can be used as the display device 29. Further, the display device 29 may be provided in the information processing apparatus 10 or may be a separate device connected to the information processing apparatus 10 by wired or wireless connection. A communication interface 27 makes communication via a network or the like, and outputs control information of the robot system 1 calculated by the information processing apparatus 10 to the robot system 1, for example. The communication interface may be Ethernet (registered trademark), and any type such as universal serial bus (USB) or serial communication can be used.

Figure 3:
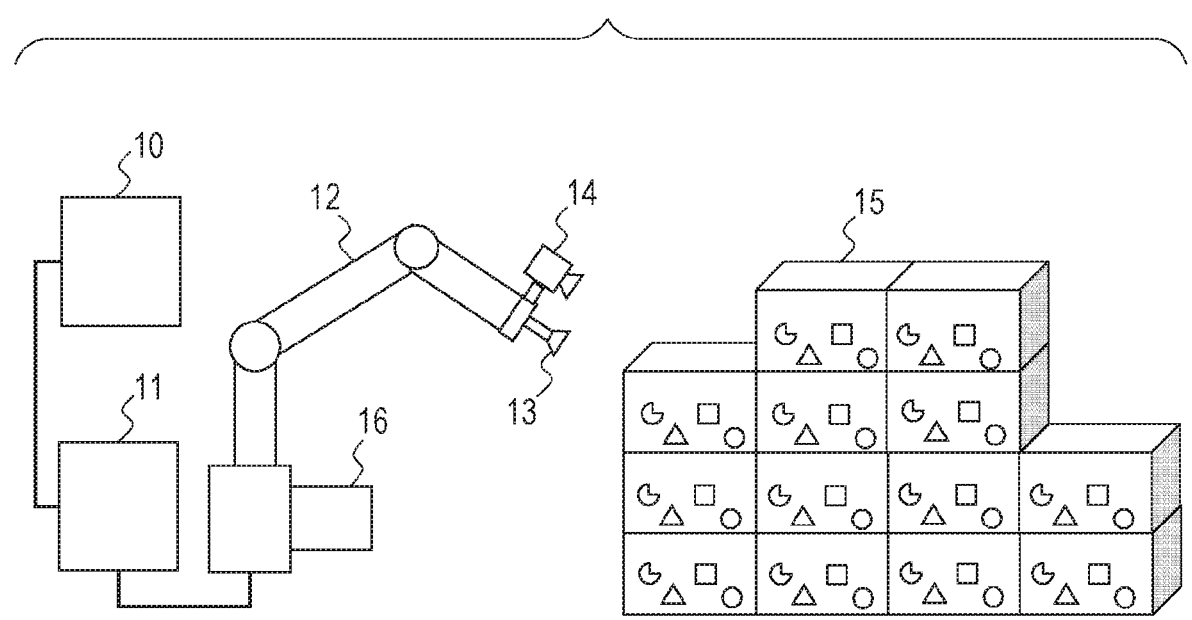
FIG. 3 is an explanatory diagram of the robot system and a target object.

FIG. 3 is an explanatory diagram of an example of the configuration of the robot system 1 according to the first embodiment. In the first embodiment, the robot system 1 is an articulated robot, for example, and includes the manipulator 12 such as a robot arm, and the gripping apparatus 13 such as a suction hand, and further the control unit 11 for controlling these components. Further, there is provided a position/orientation changing mechanism 16 which is capable of changing the position and orientation of the gripping apparatus 13 by changing the angle of each joint of the manipulator 12. The position/orientation changing mechanism 16 may be driven by an electric motor or may be driven by an actuator or the like that operates with fluid pressure such as hydraulic pressure or air pressure. The position/orientation changing mechanism 16 is driven in accordance with operation instruction information output from the control unit 11. The control unit 11 controls the robot by controlling the manipulator 12 through the position/orientation changing mechanism 16 according to the gripping position information outputted by the information processing apparatus 10 and controls the gripping apparatus 13 to grip a target object 15. In the first embodiment, the imaging device 14 is an RGB camera, and captures an image of a scene including the target object 15.

Next, the processing procedure in the first embodiment will be described. FIG. 4 is a flowchart showing an example of processing executed in the robot system 1 including the information processing apparatus 10 according to the first embodiment. In this processing procedure, initialization (S110), image capturing (S120), image acquisition (S130), image feature detection (S140), similar structure detection (S150), gripping position determination (S160), and control of the manipulator and gripping apparatus (S170) are executed. After execution of the gripping position control, a determination is made as to whether the number of gripped target objects 15 has reached a predetermined gripping number (S180).

The above processing procedure will be described in detail below. The CPU 21 of the information processing apparatus 10 initializes the system (S110). In this initialization, the CPU 21 reads out the BIOS program and the like from the ROM 22 and reads out programs from the external memory 24 as necessary, and places the information processing apparatus 10 into an operable state.

Further, the CPU 21 reads the parameters of each device connected to the information processing apparatus 10 and operates to set the robot to the initial position, and makes the robot available. In addition to these, the three-dimensional information calculating unit 150 (or the gripping position determining unit 140) determines the position and orientation to which the manipulator 12 moves so that the imaging device 14 captures images of the target object 15, and inputs the position and orientation to the control unit 11.

As long as the image of the target object 15 can be captured, the position and orientation to be determined can be decided by using any method such as determination with a random number, determination by a designer in advance with a fixed value, or determination with a random number within a range predetermined by a designer. The control unit 11 inputs the control information to the manipulator 12 based on the image capturing position and orientation that has been input, and as a result, the manipulator 12 operates. After that, the imaging device 14 executes image capturing of the target object 15 after the manipulator 12 has reached the image capturing position and orientation (S120). This image capturing may be performed under the control of the CPU 21.

The image acquisition unit 110 acquires image data of a two-dimensional image captured including an image of the target object 15 from the imaging device 14 (3130). Thereafter, the image feature detection unit 120 detects a plurality of feature points from the image acquired in S130 (S140). In the first embodiment, a SIFT feature point whose feature amount is a histogram in a gradient direction within a local area of a smoothed image is used as the feature point. As the feature point information, the position in the image and the feature amount of the feature point are calculated. In the first embodiment, the feature amount is a SIFT feature vector. The similar structure detection unit 130 calculates an image feature group constituting a similar structure based on the feature point information acquired in S140 (S150).

Figure 5A:
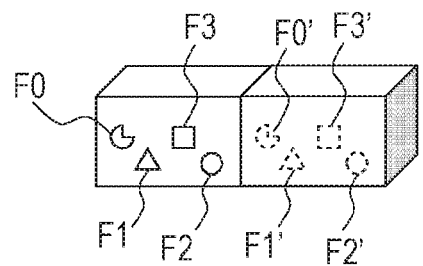
FIGS. 5A to 5G are explanatory diagrams of similar structure (unit) detection processing.
Figure 5B:
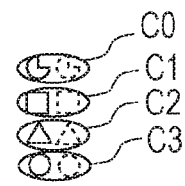

FIGS. 5A to 5G show explanatory diagrams of the similar structure detection processing. The similar structure detection unit 130 classifies the feature points into sets of feature points in which the feature vectors calculated in step S140 are similar. To be specific, in FIG. 5A, F0 to F3 and F0 to F3' are feature points and F0 and F0', F1 and F1', F2 and F2', and F3 and F3' are respectively feature points whose feature vectors are similar to each other. Then, as shown in FIG. 5B, respective feature points are classified into sets C0 to C3. Next, the two-dimensional relative-position relationship between the feature points included in different feature point sets is calculated based on the positions of the feature points in the image calculated in step S140.

The relative-position relationship between the feature points means a distance in the image between the feature points or a pair of distance and direction in the image between the feature points. Then, clustering of the feature points is carried out in such a manner that each of the plurality of image feature groups includes similar number of feature points in the feature point set, and the relative-position relationship between the feature points is similar in each of the image feature groups.

Figure 5C:
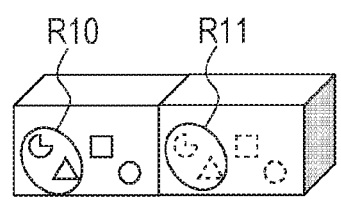
Figure 5D:
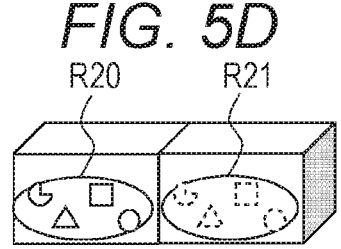

To be specific, when the relative-position relationship between F0 and F1 and the relative-position relationship between F0' and F1' are similar to each other, F0 and F1 are classified into an image feature group R10, and F0' and F1' are classified into an image feature group R11, as shown in FIG. 5C. By adapting these to a plurality of groups of feature points to combine the groups, image feature groups R20 and R21 as shown in FIG. 5D are obtained as image feature groups constituting a similar structure.

Figure 5E:
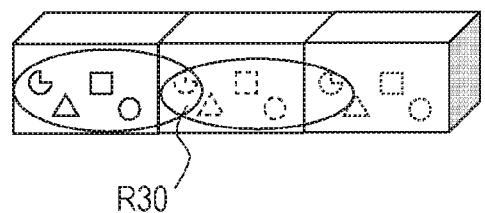

When the target objects 15 are aligned, since a plurality of similar structure patterns may exist, the image features may be classified so that an area where image feature groups overlap with each other is generated in image feature classification as shown in FIG. 5E. Therefore, at the time of clustering feature points, the presence or absence of an overlapping area such as R30 is confirmed, and when an overlapping area is present, image features that generate overlapping areas are excluded from the classification so that the overlapping areas are not generated in clustering.

Figure 5F:
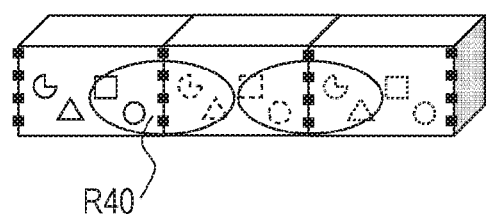

On the other hand, the area surrounding the image feature group may exist over a plurality of target objects 15 beyond the boundary of the target object 15, as shown in FIG. 5F. Here, an edge exists on the image at the boundary of the object. Therefore, when there is an edge R40 in the image feature group, clustering over the boundary of the target object 15 can be prevented by clustering the feature points so as not to cross the edges.

Figure 5G:
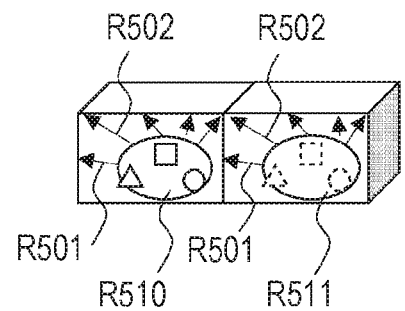

Furthermore, when the feature points do not uniformly exist on the target object 15, as shown in FIG. 5G, the area surrounding the image feature group may be biased on the target object 15. In this case, for each area surrounding the image feature group, whether another image feature group exists in a predetermined direction is determined. For example, whether there is another area in the direction R501 from the image feature group R510 in FIG. 5G is determined. Similarly, whether there is another area in the direction R501 from the image feature group R511 is determined. In this example, there is no other image feature group in the direction R501.

Whether another image feature group exists also in other directions such as the direction R502 or the like is determined. As for each direction in which other image feature group exists, each area of the image feature group is expanded in that direction.

At this time, an edge in the image of the target object 15 is detected and the area of the expanded image feature group is preferably made not to exceed the edge. In the example of FIG. 5G, other image feature groups do not exist in any direction such as R501 and R502. Therefore, the area of the image feature group R510 can be expanded within a range not exceeding the edge.

The gripping position determining unit 140 calculates a two-dimensional position in the input image in which the gripping apparatus 13 of the robot system 1 attempts gripping, as a gripping position (S160) based on the image feature group derived in step S150. To be concrete, in this example, the gravity center position of the feature points included in each image feature group is set as the gripping position. In the first embodiment, one is randomly selected from a plurality of gripping positions obtained from a plurality of calculated similar structures and is determined as the gripping position.

Next, the control unit 11 controls the manipulator 12 and the gripping apparatus 13 for the gripping operation based on the gripping position calculated by the gripping position determining unit 140 in step S160 (S170). It should be noted that the gripping position calculated in step S160 is a two-dimensional position in the image. However, in order for the robot to perform the gripping motion, calculation of the three-dimensional position where the robot attempts gripping is necessary.

Any conventional method can be used to obtain the three-dimensional gripping position. In the first embodiment, the CPU 21 of the information processing apparatus 10 controls the imaging device 14 during the operation of the robot, and captures images of the target object 15 from a plurality of viewpoints, thereby obtaining a gripping position in each image. Then, the three-dimensional information calculating unit 150 (or the gripping position determining unit 140) obtains the three-dimensional position of the gripping position by using the motion stereo method based on the orientation information of the robot at the time of capturing the image. The control unit 11 operates the manipulator 12 to move the gripping apparatus 13 based on the obtained three-dimensional gripping position. When the gripping apparatus 13 reaches the intended three-dimensional position, the control unit 11 sends a signal of the gripping operation to the gripping apparatus 13, which executes the gripping operation.

After executing S170, the CPU 21 determines whether to terminate the system. To be specific, it is determined whether the number of the target objects 15 gripped by the manipulator has reached a predetermined gripping number of target objects entered by the user through the input unit 25. If the predetermined gripping number has not been reached (N in S180), the processing returns to step S160 so that another gripping position is selected from the plurality of calculated gripping positions, and the gripping position determining unit 140 repeats the gripping operation. When the predetermined gripping number input by the user has been reached (Y in S180), the system is terminated.

Instead of inputting the gripping number to be reached by the user, the number may be indicated from a target object management system provided separately from the information processing apparatus 10 via a wired or wireless network or the like.

As described above, in the first embodiment, the similar structure detection unit 130 detects a plurality of image feature groups having a similar structure, and calculates the position of gripping the target object 15 by the gripping apparatus 13 of the robot system 1 from the image feature groups. As a result, since the gripping position can be obtained without preparing a teaching model or a CAD model, the work by the robot system 1 can be efficiently started without any labor in advance. Further, even in a situation where the target objects 15 are aligned, that is, even in a situation in which features repeatedly appear, the edge of the image is detected and the area surrounding the image feature group is made not to exceed the boundary of the target object 15 as described above so that the target object 15 can be gripped.

In the first embodiment, an RUB camera is used as the imaging device 14 for capturing an image. However, the imaging device 14 is not limited to the RGB camera, and there is no particular limitation as long as the device is a camera that captures images in real space. For example, the device may be a camera that captures a grayscale image, or may be a camera that can capture depth information, range images, and three dimensional point group data.

Further, the imaging device 14 may be a monocular camera or a camera having two or more cameras or sensors.

In particular, when using a camera capable of capturing depth information, a three-dimensional gripping position may be obtained using the depth value obtained from the depth camera instead of obtaining the three-dimensional gripping position of the robot by the motion stereo method in step S160. In addition, when a configuration having two or more cameras can be used, a gripping position may be obtained by using a depth value obtained by stereo matching between a plurality of cameras using the relative-position information of known cameras. In the first embodiment described above, the three-dimensional position of the gripping position is obtained by controlling the imaging device 14 under the control of the CPU 21 to capture an image of the target object 15 from a plurality of viewpoints during operation of the robot. However, in the case of adopting a configuration including a camera capable of capturing depth information or including two or more cameras, images of the target object 15 need not to be captured from a plurality of viewpoints.

In the above-described example of the first embodiment, the gripping apparatus 13 uses a suction hand using a suction pad for sucking the target object 15 by air pressure. However, as the gripping apparatus 13, any device that can grip the target object 15 by the robot can be used.

In addition, in each embodiment, gripping includes concepts such as holding (for example, attracting by using a vacuum suction pad or electromagnetic force) or grasping (grabbing or pinching with a plurality of fingers, for example). The gripping position is a position where a gripping force is exerted on the target object 15. In the first embodiment, the target object 15 is gripped by being sucked with the suction hand, and the gripping position means the suction position.

When pinching the target object 15 with a plurality of fingers, the gripping position determining unit 140 detects an edge or a minute gap from the vicinity of the boundary of the area surrounding the image feature group calculated by the similar structure detection unit and determines where to insert the fingers as the gripping position. Thereafter, the control unit 11 may actuate the manipulator 12 and insert the finger of the gripping apparatus 13 into the gap to grip the target object 15.

When the gripping apparatus 13 is provided with both the holding mechanism and the grasping mechanism, firstly the holding mechanism is operated to grip and lift the target object 15 to a predetermined height, and then the grasping mechanism may grasp the target object 15 so as to pinch the object.

Further, the gripping apparatus 13 is detachably attached to the manipulator 12 and may be configured to be exchangeable according to the type of the work. Further, the robot is not limited to an articulated robot, and thus may be a movable machine capable of numerical control (NC).

In the first embodiment, SIFT using two-dimensional feature points is employed as image features. However, as such feature points, any one can be adopted as long as the degree of similarity of the relative-position relationship and the feature amount between the two image features can be calculated. For example, as the two-dimensional feature point, an ORB feature point may be used which is used to generate a binary code from the comparison of brightness of two points in a local image area and to use the binary code as a feature amount.

As the definition of the image feature, characteristic positions such as corners in the image is calculated by the Harris corner detection method and an image feature with the color information of surroundings as the feature amount or an image feature with a template of the surrounding small area as the feature amount can also be used. Furthermore, character information detected by character recognition may be used as an image feature, or a combination of plural kinds of image features may be used.

Also, image features are not limited to two-dimensional feature points. When the imaging device 14 can acquire depth information, three-dimensional feature points may be used as image features. For example, Point Pair Feature may be used, which is a three-dimensional position/orientation recognition method in which the relative position of two points in three-dimensional point group having a certain normal line as a three-dimensional feature point is regarded as a feature amount. Furthermore, the SHOT feature using the histogram of the inner product of the normal line of the three-dimensional point and the normal line of the three-dimensional point located in the periphery as a feature amount, or a feature using Spin Image in which a surrounding three-dimensional point is projected on a cylindrical surface whose axis is the normal vector of a certain three-dimensional point may be used.

When a three-dimensional feature point is used, a three-dimensional relative-position relationship may be calculated and used as the relative-position relationship of the feature points in step S150, and regarding the gripping position calculated by the gripping position determining unit 140, not the two-dimensional position in an image but the three-dimensional position where the robot performs gripping may be directly obtained. In the first embodiment, an image feature group having a similar structure is obtained using the degree of similarity of the relative-position relationship and feature amount of image features. However, an image feature group having a similar structure may also be calculated using the degree of similarity of only the relative-position relationship of image features. Further, similar structure detection in step S150 may be performed based on the layout relationship between a certain feature point and surrounding feature points, after a correspondence of feature points having a similar layout in the surroundings is found.

In the above example in the first embodiment, a similar structure is calculated when there is no prior knowledge about the target object 15 such as a teaching model or a CAD model in advance. However, prior knowledge may also be used. For example, a preparatory image (actual image or an image based on a CAD model) of the target object 15 whose image has been captured alone is input as prior knowledge, and the similar structure detection unit 130 may detect similar structure between the preparatory image and the captured image.

Further, the bar code attached to the target object 15 may be given as prior knowledge. Furthermore, image features input as prior knowledge may be used. For example, configuration may be made so that the user inputs a character string printed on the target object 15 using the input unit 25, and the image feature detection unit 120 detects a character string from the captured image, whereby the similar structure detection unit 130 detects a similar structure based on the detected character string. The prior knowledge can be obtained by a method such as inputting by the input unit 25, reading from a storage device such as the ROM 22 or the external memory 24, and downloading via a network. If the prior knowledge is character information, voice input may be used. In this way, by using prior knowledge at the same time, the work by the robot can be started more stably.

In the first embodiment, an description is made by taking the operation of the robot gripping the target object 15 without using teaching models as an example in an environment in which a plurality of identical objects is arranged in alignment. However, the first embodiment is not limited to the environment in which a plurality of identical objects is arranged in alignment. When the circumstance allows the imaging device 14 to find a similar structure of each target object 15 from the captured image, the target objects 15 need not to be arranged in alignment. Therefore, as long as a similar structure of each target object 15 can be found, the target object 15 may be disposed in a rotated position or the target object 15 may be disposed to be displaced back and forth with respect to the camera for capturing the image. Furthermore, when the environment allows similar structures to be found, the target objects 15 may be stacked or boxed.

In the first embodiment, the gravity center position of the image feature group calculated in step S150 is set as the gripping position. However, when the texture of the object is unbalanced, the feature point detected by the image feature detection unit 120 is calculated so as to be at a biased position in the object, and the gripping position calculated by the gripping position determining unit 140 may be located at an end of the object. In this case, the position at which the gripping apparatus 13 of the robot system 1 grips the target object 15 largely deviates from the center of gravity of the target object 15 so that the target object 15 may not be gripped or may not be conveyed in some cases.

From this, the gripping position determining unit 140 calculates the area surrounding the image feature group in step S160, and obtains the position of gravity center of the area and the center of the inscribed circle of the area as the gripping position.

In step S160, the gripping position determining unit 140 detects an edge on the image as a boundary between the objects, and identifies the area including the image feature group surrounded by the edges as the target object 15. The gripping position determining unit 140 can also obtain the gripping position from the area corresponding to the identified target object 15 or the area occupied by the target object 15 in the captured image. At this time, the gravity center position of the area corresponding to the identified target object image in the captured image is obtained as the gripping position. Alternatively, the center of the inscribed circle of the area corresponding to the identified target object image in the captured image is obtained as the gripping position.

Also, in order for the robot to stably capture the object by suction, the object is desirably flat at the suction position. From this, when the imaging device 14 can acquire the depth information, the flatness within the area is obtained and a position where the flatness is high may be set as the gripping position. In general, at the time of gripping by suction, as the axis direction of the gripping apparatus 13 becomes closer to the direction perpendicular to the flat surface, the attraction force becomes stronger. Therefore, by determining the gripping orientation so that the difference between the normal direction to the flat surface and the axial direction of the gripping apparatus 13 is equal to or less than a predetermined threshold value, the axis direction of the gripping apparatus 13 is made close to the direction perpendicular to the flat surface so that the attraction force can be secured.

In the first embodiment, among the gripping positions calculated by the gripping position determining unit 140, priority is not given particularly to the gripping position of the robot and the order of the gripping. However, the gripping positions and the gripping order can also be prioritized based on the calculation result of the similar structure.

For example, a high priority may be given to a gripping position which has a large number of feature points of each image feature group detected by the similar structure detection unit 130, or a high priority may be assigned to a gripping position which has a large area surrounding the similar structure. When the imaging device 14 can acquire the depth information, high priority order may be given to a gripping position having a high flatness around the gripping position. The gripping apparatus 13 may perform the gripping operation according to the priority order of the gripping positions.

First Modification Example

Figure 6:
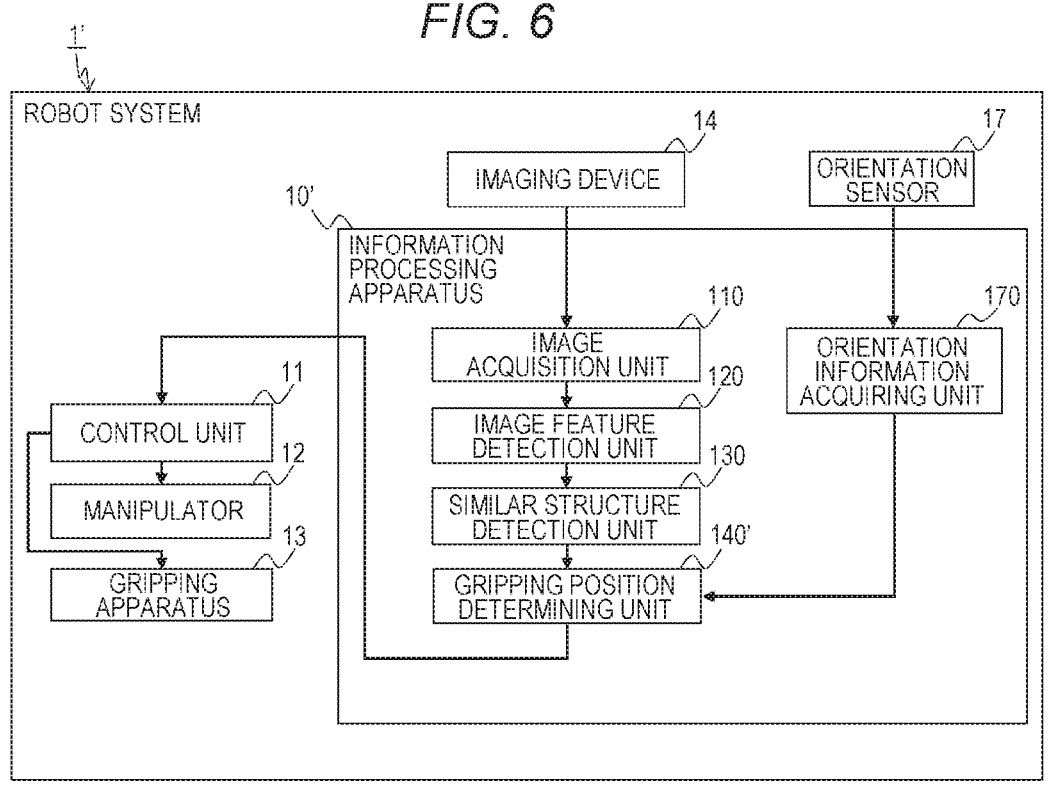
FIG. 6 is a functional block diagram of the robot system in a modification example.

FIG. 6 shows a first modification example of the first embodiment. The robot system 1' further includes an orientation sensor 17 for detecting the orientation of the manipulator 12, and an information processing apparatus 10' is provided with an orientation information acquiring unit 170. Furthermore, the information processing apparatus 10' has a gripping position determining unit 140' instead of the gripping position determining unit 140. The robot system 1' of the first modification example is different from the robot system 1 of FIG. 1 in these respects.

For the sake of simplicity of description, in the modification examples and each embodiment described below, it is assumed that the gripping position determining unit 140 has the function of the three-dimensional information calculating unit 150, and thus description will be made with the three-dimensional information calculating unit 150 omitted. Like the image acquisition unit 110, the orientation information acquiring unit 170 and the gripping position determining unit 140' are also constructed as software and controlled by the CPU 21. Incidentally, unless otherwise specified, all the functions built in information processing apparatuses 10, 10', 20, 30, 40 and 40', also in the other embodiments and modification examples, are constructed as software and controlled by the CPU 21.

In this example, the orientation sensor 17 is attached to the imaging device 14. In the information processing apparatus 10', the orientation information acquiring unit 170 acquires orientation information front the orientation sensor 17 and inputs the orientation information to the gripping position determining unit 140'.

Also, the gripping position determining unit 140' obtains the gripping position similarly to the gripping position determining unit 140, and determines the priority order for the gripping position based on the orientation information acquired by the orientation information acquiring unit 170.

Since other configurations in FIG. 6 are similar to those of the robot system 1, the description thereof will be omitted.

Figure 7:
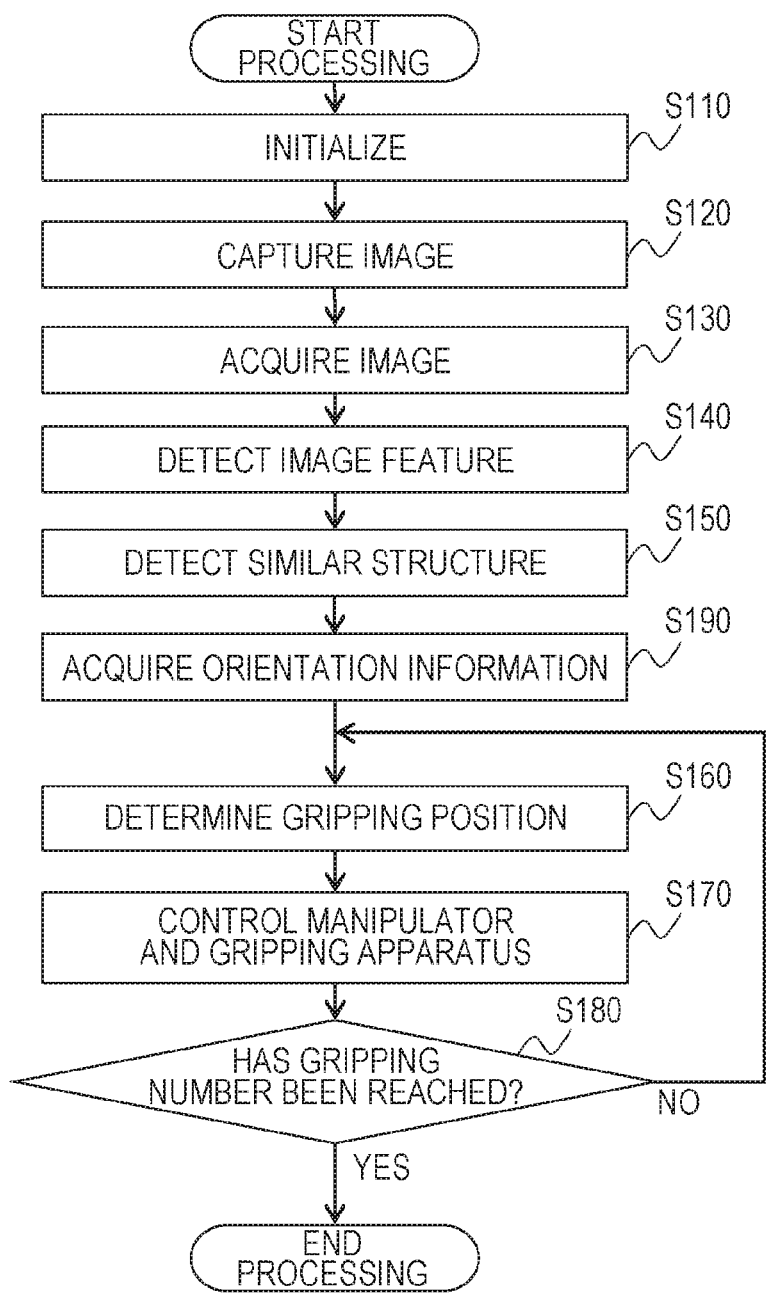
FIG. 7 is a flowchart showing processing executed in the robot system.

FIG. 7 shows specific processing steps in the first modification example. Steps S110 to S150 are the same as steps in the flowchart shown in FIG. 4, and description thereof is omitted. After executing S150, the orientation information acquiring unit 170 in the CPU 21 obtains the orientation information of the orientation sensor in step S190, and obtains the direction of gravity in the image acquired by the image acquisition unit 110. In step S160, the gripping position determining unit 140' in the CPU 21 may determine order sequentially from the upper gripping position in the direction of gravity. Since S170 and S130 in FIG. 7 are the same as steps in the flowcharts in the robot system 1 shown in FIG. 4, the description thereof will be omitted.

Further, the orientation sensor 17 may be attached to the manipulator 12 instead of the imaging device 14. At this time, the position and orientation of the imaging device 14 can be calculated based on the position and orientation of the manipulator 12, and the direction of gravity with respect to the imaging device 14 can be obtained. In this case, the gripping position determining unit 140' determines the priority order sequentially from the gripping position on the upper side in the direction of gravity. In this manner, by gripping the target object 15 preferentially at the gripping position on the upper side in the direction of gravity, the target object 15 can be gripped from the top of the target objects 15 when the target objects 15 are stacked in the vertical direction, for example. Therefore, collapsing the stacked target objects 15 by gripping a target object 15 under another target object 15 can be avoided.

Second Modification Example

In the first embodiment, an example has been described in which a similar structure in a captured image is detected, and a gripping position at which the robot grips the target object 15 is calculated, whereby the robot gripping operation is executed. In the display device 29, calculation results of information processing in the information processing apparatus 10 and other necessary information are displayed. However, with such a configuration, the user who monitors the operation cannot confirm where the gripping of the robot is performed until the robot performs the gripping operation.

Therefore, in the second modification, an example of exhibiting any one or more of the detection results of the similar structure, the gripping position, and the gripping order on any exhibition unit will be shown.

Figure 8:
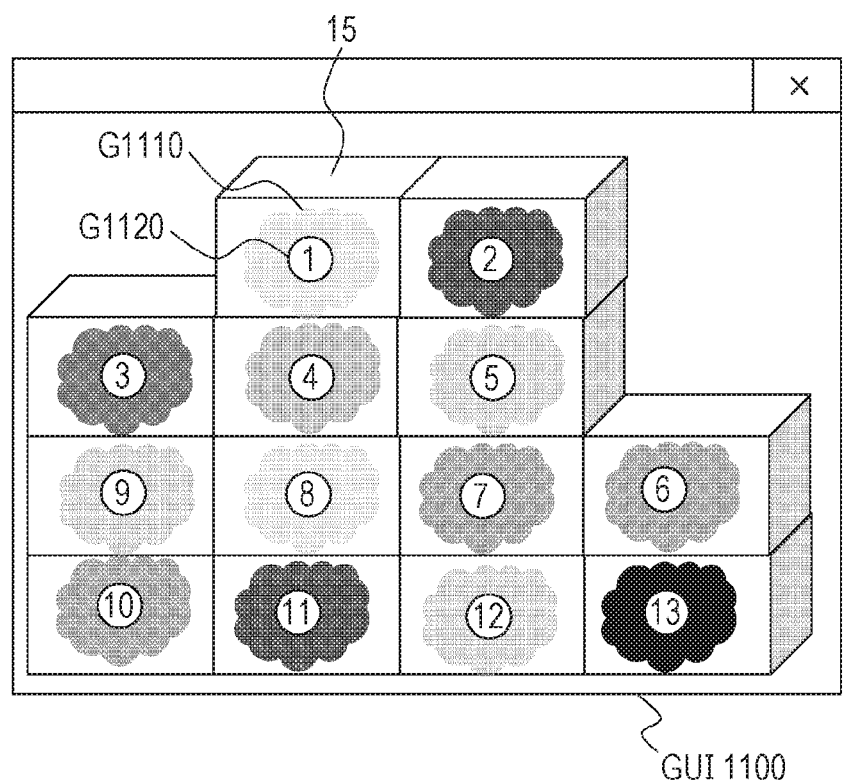
FIG. 8 is an explanatory diagram of a GUI outputting a detection result of a gripping position.

FIG. 8 is an explanatory diagram of a graphical user interface (GUI) on which the display unit 26 displays the detection result of the gripping position for the user under the control of the CPU 21 using a display as the display device 29. In this GUI, the image feature group G1110 calculated in step S150, the gripping position and the gripping order G1120 are superimposed with CG an the target object 15 shown in the image captured by the imaging device 14. As shown, the gripping order is represented by circled numbers.

Preferably, the color may be changed for each image feature group so that the user can easily understand the situation, and the color of the gripping position or the gripping order may be made to agree with the color of the image feature group. In the second modification example, as the image feature group G1110, areas surrounding respective image feature groups are exhibited. However, as the image feature group G1110, feature points included in each image feature group may be exhibited, or a line segment connecting image feature groups may be exhibited.

Furthermore, the exhibition device is not limited to a display. For example, by using a projector (not shown), one or more of the similar structure, gripping position, and gripping order may be projected onto the target object 15 or may be printed on paper using a printing device (not shown).

Third Modification Example

In the first embodiment, a robot gripping operation is executed by detecting a similar structure in an image and calculating a gripping position at which the robot grips the target object 15. However, the detection result of the image feature group may also be corrected based on the input information input from the user through the input unit 25, or a new image feature group may be detected.

Figure 9:
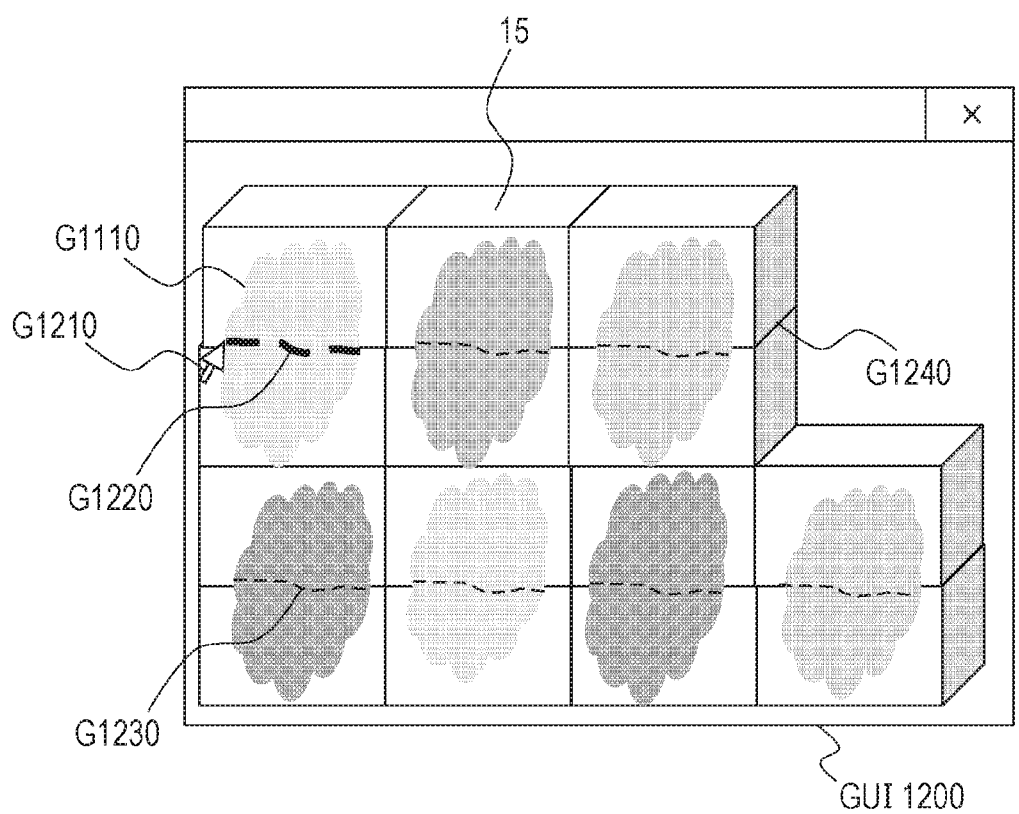
FIG. 9 is an explanatory diagram of the GUI in a modification example.

FIG. 9 shows an example of the GUI in the third modification example in which the user performs input for correcting the similar structure detection result. In this example, the target object 15 is shown in the GUI 1200, and the boundary G1240 between the target objects can be visually recognized as indicated by the sign G1240. On the other hand, the image feature group G1110 includes the boundary G1240 and is shown to be formed over a plurality of target objects 15.

From this fact, the user can determine that the similar structure detection unit 130 erroneously recognizes the two target objects 15 as one object in FIG. 9, and as a result, determine that the image feature group G1110 is formed to include the boundary G1240. Therefore, in this example, the user inputs the boundary line G1220 of the target object 15 using the cursor G1210 for the image feature group G1110 which is any one of the detection result among the image feature groups exhibited by the GUI 1200.

The user can operate the cursor G1210 by an operating device such as a mouse and input the boundary line G1220 into the image feature group G1110 to divide the image feature group.

At this time, based on the image feature group G1110 divided by the boundary line G1220, the CPU 21 of the information processing apparatus 10 may automatically insert the boundary line G1230 into other image feature groups by image recognition or the like to divide the image feature groups.

In addition, the CPU 21 may correct the similar structure calculation result made by the similar structure detection unit 130 by correcting so that the degree of similarity of the relative-position relationship of the image feature group crossing the boundary becomes lower.

Note that the user's input is not limited to the boundary between two objects. For example, a new similar structure may be input. For example, the user may input an area surrounding an object using the cursor G1210. In this case, the similar structure detection unit 130 may newly detect the similar structure by image recognition or the like using an image feature in the area input by the user and an image feature in the remaining area. Further, the user may directly input the gripping position instead of the similar structure.

Second Embodiment

In the first embodiment, the gripping position of the robot is calculated using a similar structure. In the second embodiment, an example is shown in which gripping is carried out at another gripping position when the calculated gripping position is inappropriate and the robot fails to grip the target object 15. As described above, even if the initially calculated gripping position is inappropriate and the gripping of the target object 15 fails, another gripping position is obtained and the target object 15 is gripped at the newly obtained gripping position, whereby the gripping performance is enhanced.

Figure 10:
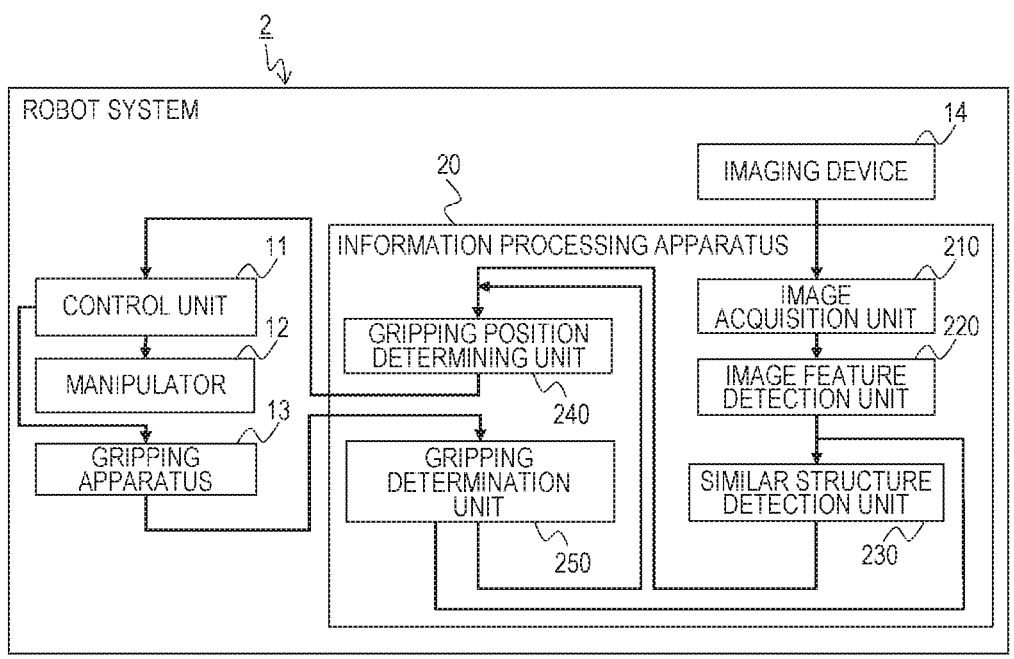
FIG. 10 is a functional block diagram of a robot system according to a second embodiment.

FIG. 10 is a functional block diagram of a robot system 2 including the information processing apparatus 20 according to the second embodiment. Since an image acquisition unit 210 to a gripping position determining unit 240 in the second embodiment are the same as the image acquisition unit 110 to the gripping position determining unit 140 in the information processing apparatus 10, the description thereof will be omitted. The robot system 2 of the second embodiment is different from the robot system 1 of the first embodiment in that a gripping determination unit 250 is added.

In the second embodiment, when the gripping apparatus 13 grips the target object 15, the gripping determination unit 250 determines whether the gripping has succeeded or failed, based on the gripping result information input from the gripping apparatus 13. Here, the gripping result information is information generated by the gripping apparatus 13 in order to determine whether the target object 15 has been gripped successfully. When the gripping apparatus 13 has a suction mechanism, the gripping apparatus 13 inputs the degree of vacuum achievement at the time of suction to the gripping determination unit 250. Hereinafter, the case where the gripping apparatus 13 has the suction mechanism will be described, but the gripping apparatus may perform the gripping by means other than the suction mechanism.

The gripping determination unit 250 determines whether the target object 15 has been gripped successfully, from the degree of vacuum achievement. In the case where the degree of vacuum at the portion where the gripping apparatus 13 is in contact with the target object 15 during suction is high, the gripping determination unit 250 determines that the target object 15 is normally gripped. On the other hand, when the degree of vacuum at the contact portion described above is low, the gripping determination unit 250 determines that the target object 15 is not normally gripped.

When the gripping fails, the gripping determination unit 250 outputs the position information on the gripping position of the gripping apparatus 13 at the time of gripping failure to a similar structure detection unit 230 and the gripping position determining unit 240. Then, the gripping position determining unit 240 determines another gripping position different from the position where the gripping has failed.

Figure 11:
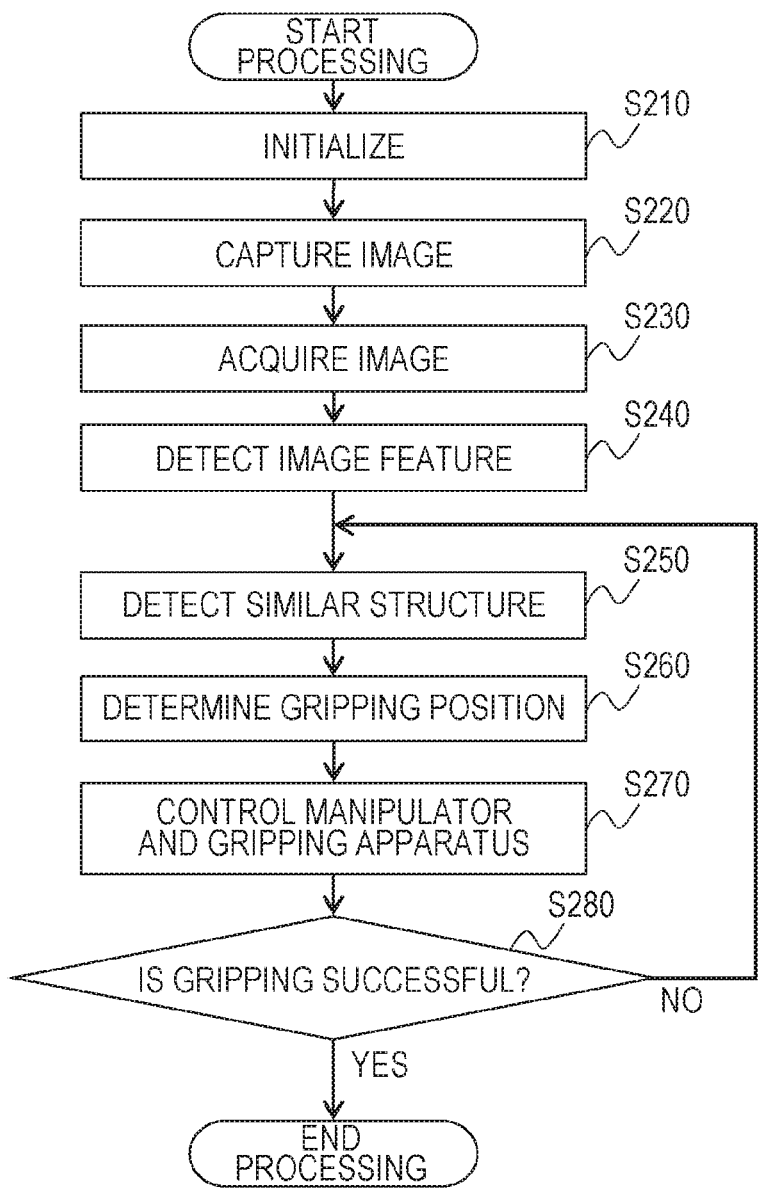
FIG. 11 is a flowchart showing processing executed in the robot system.

FIG. 11 is a flowchart showing the processing procedure in the second embodiment. Steps S210 to S270 in the second embodiment are the same as S110 to S170 in the first embodiment, and the description thereof will be omitted. The second embodiment is different from the first embodiment in that gripping success determination (S280) is performed.

After S270 is executed, the gripping determination unit 250 determines whether the gripping apparatus 13 has successfully gripped the target object (S280). To be specific, a threshold value of the degree of vacuum achievement for determining that the suction is successful is set in advance with respect to the degrees of vacuum achievement obtained from the gripping result information from the gripping apparatus 13. When the degree of vacuum achievement obtained from the gripping apparatus 13 has reached the threshold value (Y in S280), the gripping determination unit 250 determines that suction succeeds (gripping success), and the processing is completed. If the threshold value has not been reached, the gripping determination unit 250 determines that the suction failed (gripping failure) (N in S280), and the processing returns to S250. Thereafter, the similar structure detection unit 230 calculates another similar structure pattern. Specifically, the gripping position where gripping has failed is regarded as an object boundary, and the degree of similarity of the relative-position relationship of the image feature group passing through the gripping position of the failed gripping is lowered. As a result, a similar structure is newly calculated so that the boundary is not included in the gripping position.

In step S260, the gripping position determining unit 240 determines a new gripping position based on the position of failed gripping and the similar structure newly calculated by the similar structure detection unit 230, and the control unit 11 controls the manipulator and the gripping apparatus. Thereafter, the processing proceeds again to S280, and the above-described processing is repeated until the determination result of S280 becomes Y.

As described above, in the second embodiment, when the robot system 2 fails in picking, a new similar structure pattern is calculated for recalculating the gripping position of the robot. As a result, even if the robot fails to grip the target object 15, the robot can grip the object again at another gripping position until the gripping is successful, and the gripping performance can be improved.

In the second embodiment, when the robot fails in gripping, the similar structure detection unit 230 newly detects another similar structure and calculates the gripping position of the robot. However, the similar structure detection unit 230 may calculate a plurality of similar structure patterns in advance, and the gripping position determining unit 240 may assign priorities to a plurality of similar structure patterns in advance. Then, when the gripping is unsuccessful, the gripping position may be selected according to the priority order of the similar structure pattern. As a unit of a new similar structure, it is conceivable to treat two separated structures as one unit of similar structure for example as shown in FIG. 8. When two products are packed in one container and gripped on a container unit basis, gripping tends to succeed when using the similar structure pattern of such units.

As a prioritization technique of similar structure patterns, for example, priorities may be assigned to similar structures in descending order of the number of image feature groups calculated by the similar structure detection unit 230. Further, priorities may be assigned to similar structures in descending order of the average of the number of feature points included in each image feature group.

Furthermore, priorities may be assigned to similar structures in descending order of the degree of similarity of relative-position relationship between feature points included in each image feature group. Further, the gripping apparatus 13 may perform the gripping operation according to the ordering of the gripping positions. In this way, by calculating a plurality of similar structure patterns in advance and preparing a plurality of gripping positions to which priorities have been assigned, there is no need to perform a processing of calculating a gripping position every time gripping fails, and thus the processing time can be shortened by determining the gripping position rapidly.

In the second embodiment, when the robot fails in gripping, another similar structure pattern is newly detected and the gripping position of the robot is calculated. However, instead of newly calculating another similar structure pattern, the gripping position determining unit 240 may determine the gripping position calculated from another image feature group.

To be specific, in the first gripping trial, priority order is given in descending order of area of the image feature group among the image feature groups calculated by the similar structure detection unit 230, and gripping is attempted for the image feature group having the highest priority order. When the gripping fails, the image feature group having the second largest area among the image feature groups calculated by the similar structure detection unit 230 is determined as the gripping position in the second trial. Hereinafter, trial of gripping is performed in order from the image feature group with the highest priority.

Further, priority order may be given to the gripping positions in descending order of the average of the number of feature points included in the image feature group, or priority may be given to the gripping positions in descending order of the degree of similarity in the relative-position relationship between the feature points included in each image feature group. Further, the gripping apparatus 13 may perform the gripping operation according to the priority order of the gripping positions.

In this manner, by determining the gripping position calculated from the image feature group different from the image feature group used in the first trial, gripping can be attempted for the target object 15 different from the target object 15 of the first trial.

In the case where the gripping position is correct but the gripping attempt fails due to the fact that the target objects 15 are closely arranged without gaps. Attempting to grip another target object 15 is preferable to attempting to grip the same target object 15 at other gripping positions. In this case, gripping can be attempted with respect to another target object 15 by calculating the gripping position based on another image feature group.

In the second embodiment, whether the gripping is successful is determined by measuring the degree of vacuum achievement of the suction hand which is the gripping apparatus 13.

However, as long as whether the gripping apparatus 13 has successfully gripped the target object 15 or failed can be determined, any method can be used as the determination method. For example, the success or failure of the gripping may be determined using a force sensor (not shown) mounted on the gripping apparatus 13, or the success or failure of the gripping may be determined by a proximity sensor (not shown). Further, the success or failure of the gripping may be determined based on the image of the gripping apparatus 13 captured by the imaging device 14 at the time of executing the gripping operation. Furthermore, in the case where the gripping apparatus 13 is a multi-fingered hand, the success or failure of the gripping may be determined based on the opening and closing angle of the hand.

Third Embodiment

In the first embodiment, the gripping position of the robot is calculated using a similar structure. In the second embodiment, when the calculated gripping position is incorrect and the robot fails in the gripping trial, gripping is tried at another gripping position again. In the third embodiment, when the calculated gripping position is incorrect and the robot fails in the gripping trial, the robot moves the target object 15 and observes the movement to calculate the gripping position where stable gripping is secured.

Figure 12:
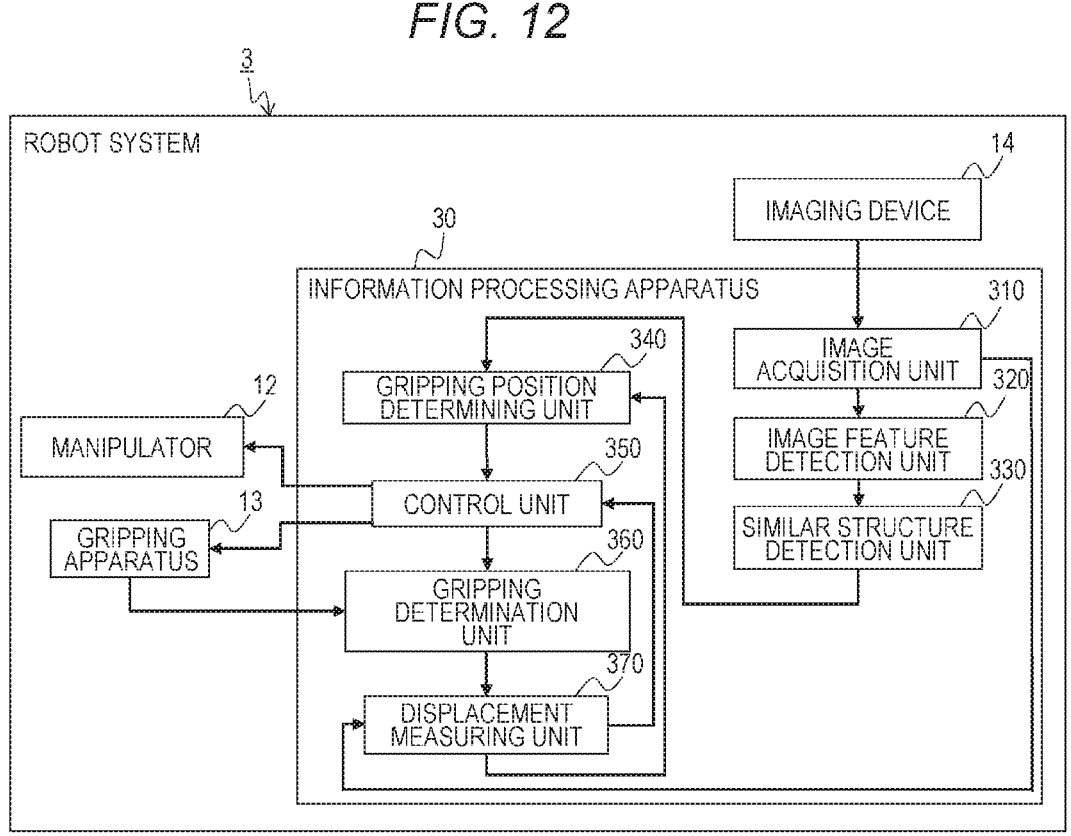
FIG. 12 is a functional block diagram of a robot system according to a third embodiment.

FIG. 12 is a functional block diagram of a robot system 3 including the information processing apparatus 30 according to the third embodiment. An image acquisition unit 310 to a gripping position determining unit 340 and a gripping determination unit 360 in the third embodiment are the same as the image acquisition unit 210 to the gripping position determining unit 240 and the gripping determination unit 250 in the second embodiment, and thus the description is omitted.

The third embodiment is different from the second embodiment in that a control unit 350 and a displacement measuring unit 370 for performing displacement detection are newly added.

The control unit 350 controls the manipulator 12 and the gripping apparatus 13 for gripping operation by outputting control information thereto, with the gripping position determined by the gripping position determining unit 340 as an input. In addition to control thereof, when the gripping determination unit 360 determines that gripping has failed at the time of gripping trial, the control unit 350 outputs the control information to the manipulator 12, which is operated to move the target object 15.

The image of the target object 15 before execution of the gripping motion captured by the imaging device 14 and the image of the target object 15 after the manipulator 12 has moved the target object 15, which are acquired by the image acquisition unit 310 are input in the displacement measuring unit 370. The displacement measuring unit 370 measures displacement of the target object 15, and generates displacement information to output the information to the gripping position determining unit 340 and the control unit 350.

Figure 13:
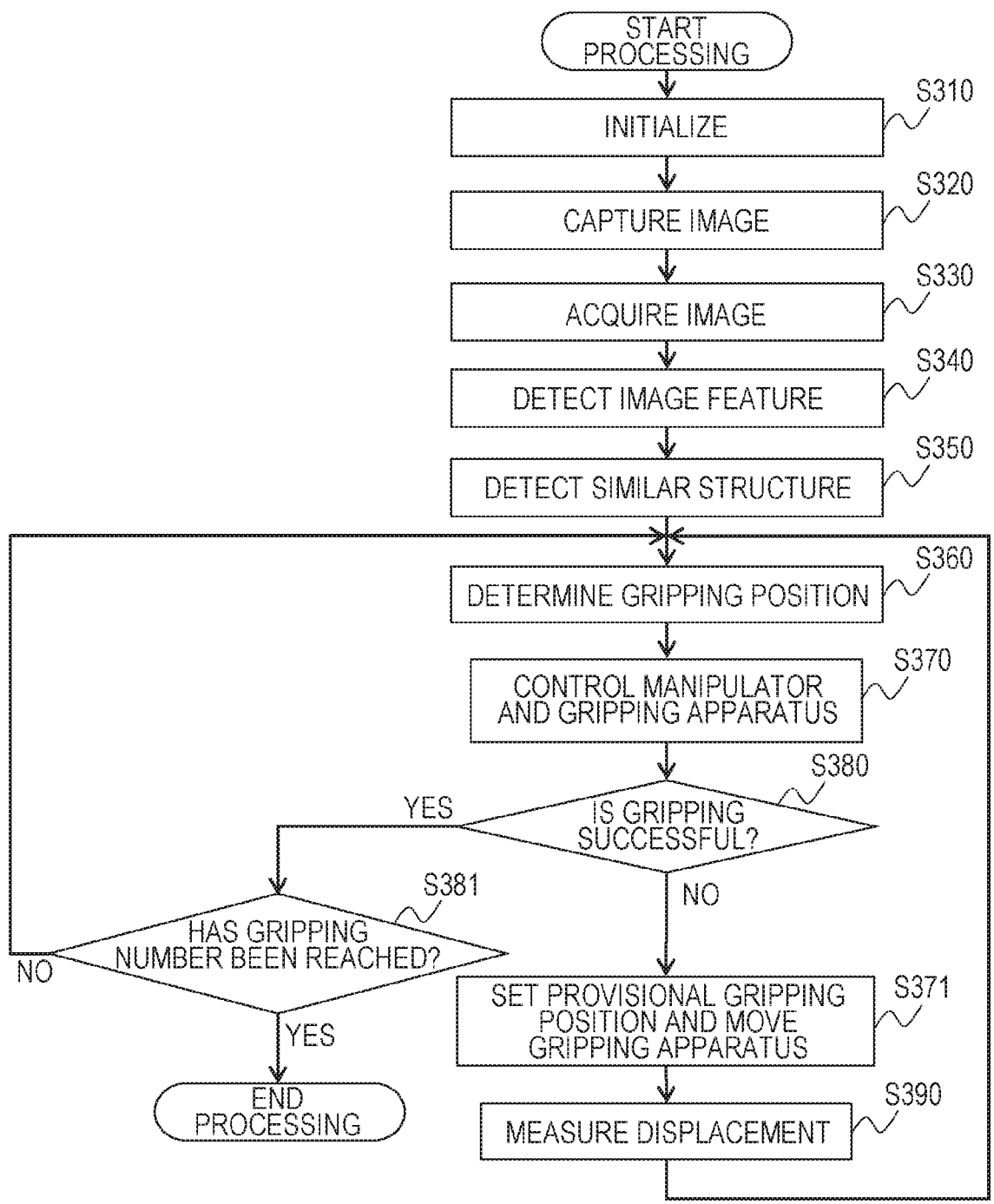
FIG. 13 is a flowchart showing processing executed in the robot system according to the third embodiment.

FIG. 13 is a flowchart showing an example of processing executed by the robot system 3 in the third embodiment. Since S310 to S380 in FIG. 13 are the same as S210 to S280 in the second embodiment, description thereof is omitted.

The third embodiment is different from the second embodiment in that provisional gripping position setting and gripping apparatus movement (S371) are performed and displacement measurement (S390) is performed.

After S370 is executed, the gripping determination unit 360 determines whether gripping is successful (S380). When the gripping is successful (Y in S380), whether the gripping number has been reached is determined (S381) as in the S280 of the second embodiment, and if not (N in S381), S360 is repeated, and if the number has been reached (Y in S381), the process is terminated.

On the other hand, if it is determined in S380 that the gripping has failed (N in S380), the control unit 350 operates the manipulator 12 to move the target object 15 (S371).

To be specific, the gripping position determining unit 340 sets a provisional gripping position around the position where the gripping has failed. The provisional gripping position can be set by using any method such as setting from image features, etc., or selection of a random position in the vicinity of the position where gripping has failed. The control unit 350 controls the manipulator 12 to move the gripping apparatus 13 to the provisional gripping position. Thereafter, the control unit 350 attempts the suction operation at the provisional gripping position by the gripping apparatus 13, and when the suction is successful, the control unit 350 controls the manipulator 12 to displace the target object 15 by a predetermined minute distance. In the third embodiment, the target object 15 is lifted by a predetermined minute height. Thereafter, the imaging device 14 captures an image of the target object 15. After image capturing, the control unit 350 returns the target object 15 to the original position and ends the suction operation.

After that, the displacement measuring unit 370 compares the captured images before displacement and after displacement. Specifically, the displacement region of the target object 15 is calculated from the image captured by the imaging device 14 before the gripping motion is performed and the image captured while the manipulator 12 is lifting up the target object 15 using suction (S390).

To be specific, the displacement measuring unit 370 obtains a region where the image difference exceeds a predetermined threshold value between the image before the gripping motion is executed and the image in which the manipulator 12 is sucking the target object 15, that is, a displacement region corresponding to the target object 15. Since the displacement region includes the region before movement of the target object 15 and the region after movement of the target object 15, the region is exactly larger than the target object 15. However, as described above, since the movement distance of the target object 15 is very small, the displacement region can be substantially regarded as the region corresponding to the target object 15. Thereafter, the processing returns to S360, and the displacement measuring unit 370 outputs the calculated position of the center of gravity of the displacement region corresponding to the target object 15 as the gripping position to the gripping position determining unit 340.

Further, after obtaining the displacement region corresponding to the target object 15, the displacement measuring unit 370 may input the displacement region to the gripping position determining unit 340 without obtaining the gripping position candidate. In this case, the gripping position determining unit 340 determines the gripping position while regarding the displacement region as the region of the target object 15.

As described above, in the third embodiment, when the gripping apparatus 13 of the robot system 3 fails in picking, the target object 15 is moved by the gripping apparatus 13, and the region of the target object 15 is obtained from the displacement information of the target object 15, whereby the gripping position by the gripping apparatus 13 is calculated again. Thereby, even if the robot fails to grip the object by failing to detect the similar structure or the like, the gripping position can be calculated and the gripping performance can be improved.

In the third embodiment, the target object 15 is sucked and lifted to a predetermined height, whereby the region of the target object 15 is calculated from the difference between the captured images before and after the height change. However, the calculation method of the region of the target object 15 is not limited to the difference between the captured images.

For example, when the imaging device 14 can measure three-dimensional information, the depth in each target object 15 may be measured and the target region may be calculated from the difference in the measured depth of each target object 15.

The method of moving the target object 15 is not limited to lifting. For example, the target object 15 is moved by the robot so as to slide, and the feature points detected in the image during the movement is tracked by the Kanade-Lucas-Tomasi (KLT) feature tracker method, and then the target region may be clarified from the amount of displacement of the feature point during the tracking.

Alternatively, a feature point may be detected in the images before and after sliding of the target object 15, and the target region may be obtained from the movement distance of the corresponding feature point by feature point matching.

In the third embodiment, the robot moves the target object 15, and obtains the region of the target object 15 from the displacement information of the target object 15, and then the gripping position of the robot is recalculated. However, not only recalculation of the gripping position of the robot but also updating of similar structure and image feature group may be performed.

To be concrete, a similar structure detection unit 330 may detect an image feature group having a similar structure between image features existing in the region of the target object 15 obtained by the robot moving the target object 15 and image features in the remaining region.

Further, in the third embodiment, when the robot gripping operation fails, the robot moves the target object 15 and obtains the region of the target object 15 from the displacement of the target object 15 in the images captured before and after the movement. However, the region of the target object 15 may be made clear by moving the target object 15 before performing similar structure detection. At this time, the position at which the target object 15 is to be moved may be determined by a random number or the target object 15 at the center of the image may be determined to be moved. Alternatively, a position where the patterns of the target object 15 and image features are congested may be obtained from the captured image, and the target object 15 at the obtained position may be moved.

Fourth Embodiment

In the first to third embodiments, the first target object 15 is gripped after detecting similar structures. In the fourth embodiment, the recognition performance is improved by referring to the result and executing detection of the similar structure again after successful gripping of the first target object 15.

Figure 14:
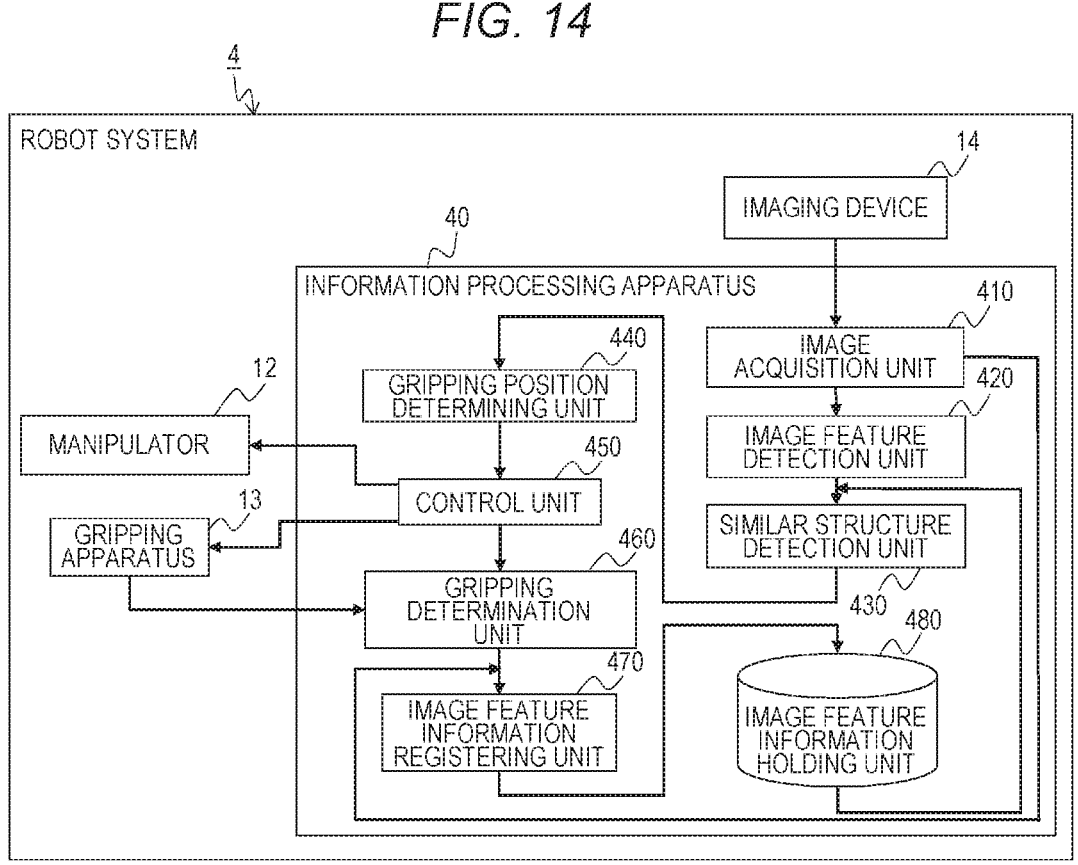
FIG. 14 is a functional block diagram of a robot system according to a fourth embodiment.

FIG. 14 is a functional block diagram of a robot system 4 including the information processing apparatus 40 according to the fourth embodiment. Since an image acquisition unit 410 to a gripping determination unit 460 in the fourth embodiment are the same as the image acquisition unit 310 to the gripping determination unit 360 of the information processing apparatus 30 shown in the third embodiment, the description thereof will be omitted. The fourth embodiment is different from the third embodiment in that the fourth embodiment includes an image feature information registering unit 470 and an image feature information holding unit 480.

The gripping success information determined by the gripping determination unit 460 is input to the image feature information registering unit 470. When the gripping is successful, the image of the gripped target object 15 is captured again by the imaging device 14. An image feature detection unit 420 detects the image features from the image captured again and outputs the detected image features as the image feature group to the image feature information holding unit 480.

The image feature information holding unit 480 holds the image feature information input from the image feature information registering unit 470. In the fourth embodiment, the position and the feature amount of the feature point in the image are held as the image feature information. Also, the held image feature information is output to a similar structure detection unit 430.

Figure 15:
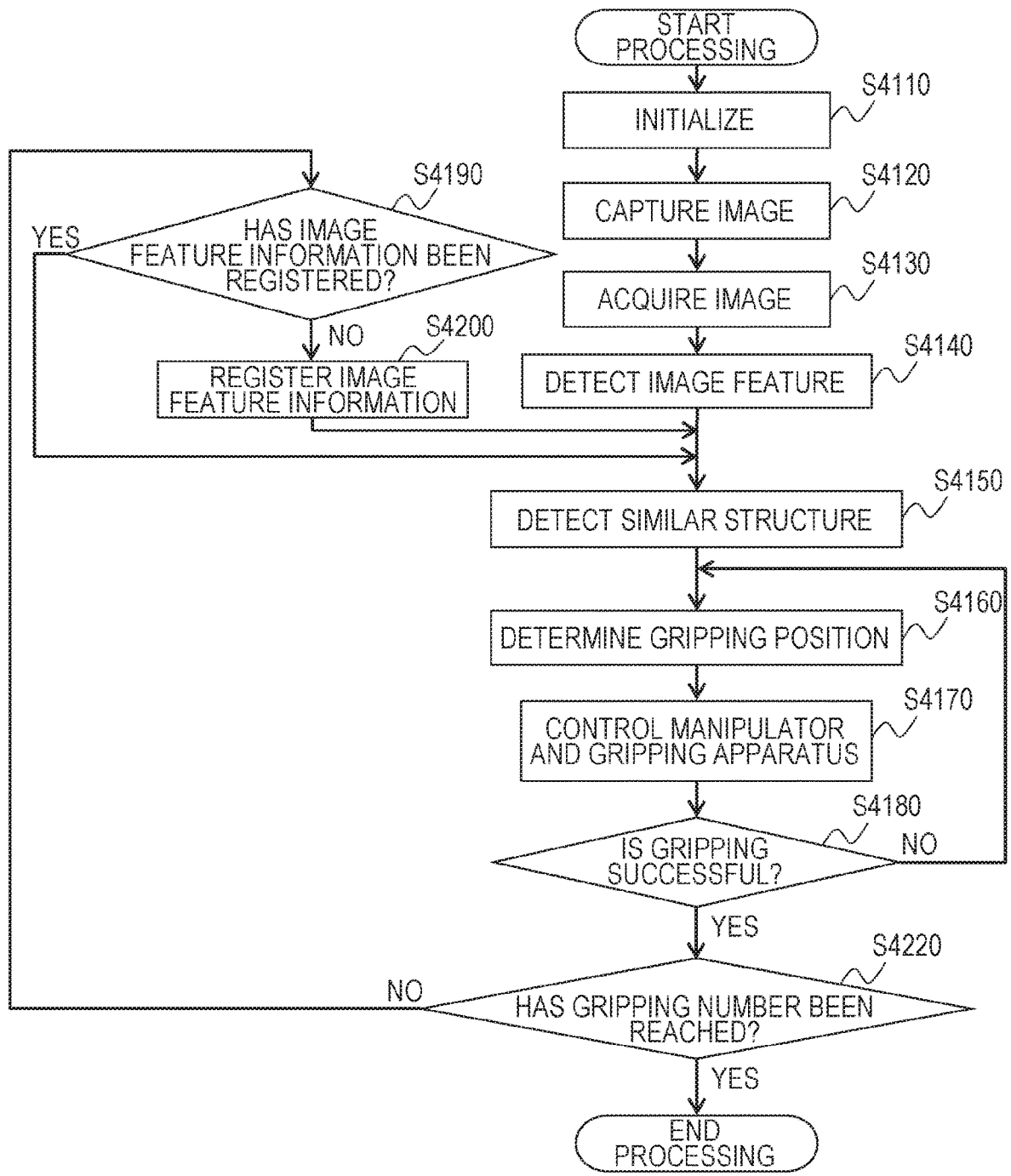
FIG. 15 is a flowchart showing processing executed in the robot system according to the fourth embodiment.

FIG. 15 is a flowchart showing processing executed by the robot system 4 in the fourth embodiment. Steps S4110 to S4170 in the fourth embodiment are the same as the processing procedures in the initialization S310 to S370 in the third embodiment, and therefore the description thereof will be omitted. The fourth embodiment is different from the third embodiment in that image feature information registration determination (S4190) and image feature information registration (S4200) are performed.

In the fourth embodiment, the processing proceeds from S4110 to S4170 in the same manner as in the third embodiment. After S4170 is executed, whether the gripping is successful is determined (S4180). If the gripping has failed (N in S4180), S4160 is executed again. When the gripping is successful (Y in S4180), as in S180 of the first embodiment, whether the gripping number has been reached is determined (S4220). When the gripping number has been reached (Y in S4220), the processing is terminated. The image feature information holding unit 480 holds the size of the unit of the target object 15 detected on the first attempt when the gripping is started. The manipulator is controlled using the held information and the gripping of the target object 15 is repeated without newly determining the size of the unit of the target object 15 until the gripping number is reached.

When the gripping number has not been reached (N in S4220) the image feature information registering unit 470 determines whether the image feature information of the target object 15 is held in the image feature information holding unit 480 (S4190). When the image feature information is not stored in the image feature information holding unit 480 (N in S4190), the image feature information registering unit 470 performs image feature information registration (S4200) and executes S4150 again. When the image feature information has already been held (V in S4190), the processing proceeds to S4150, and the similar structure detection unit 430 detects a new similar structure using already held information.

Details of step S4200 will be described. The image feature information registering unit 470 registers the image feature information of the target object 15 in the image feature information holding unit 430. In this case, under the control of the CPU 21 of the information processing apparatus 40, the image feature to be registered is measured, and the target object 15 which has been successfully gripped is lifted by the gripping apparatus 13 and conveyed to the destination.

After the gripping apparatus 13 places the target object 15 at the transfer destination, the imaging device 14 captures an image of the target object 15. Then, the image feature detection unit 420 detects the image features of the target object 15 from the captured image. Next, the image feature information registering unit 470 registers the detected image feature information in the image feature information holding unit 480.

In step S4150, a similar structure is detected again based on the registered image feature information. To be more specific, the similar structure detection unit 430 detects an image feature group having similar structures to ones in the registered image feature information from the captured images of the target object 15. Then, the similar structure calculation result calculated previously is corrected and added. Based on the calculated similar structure, the similar structure detection unit 430 corrects the gripping position obtained when a gripping position determining unit 440 first detects the position in step S4160 and detects a new gripping position.

As described above, in the fourth embodiment, image features detected from the target object 15 that has been successfully gripped are registered. Then, obtained is an image feature group having similar structures between the registered image features and the image features registered from the image obtained by capturing an image of the target object 15, and the detection result of the gripping position is corrected and newly detected.

As described above, even if an image is erroneously detected at the first detection, the gripping position can be corrected, and the target object 15 undetected at the first detection can be newly detected, which improves the recognition performance.

In the fourth embodiment, SIFT feature points are used as image features, but any other image features can be used as the image features. As described in the first embodiment, any image features may be held as long as the degree of similarity of the relative-position relationship and the feature amount between the two image features can be calculated.

What the image feature information holding unit 480 holds is not necessarily limited to image features. For example, the relative-position relationship of the gripping success position with respect to the image feature group of the target object 15 which has been successfully gripped may be held. As a result, the gripping position determining unit 440 may determine the gripping position with respect to the other image feature group detected by the similar structure detection unit 430 from the relative-position relationship.

Further, when gripping fails, the relative-position relationship at the time of failed gripping with respect to the image feature group of the target object 15 may be held. At this time, when determining the gripping position, the gripping position determining unit 440 may correct the determined gripping position so as to avoid the relative position at the time of failed gripping with respect to another image feature group detected by the similar structure detection unit 430. Further, as described in the second embodiment, the similar structure detection unit 430 may calculate another similar structure pattern (s4150) when gripping fails (s4180).

In the fourth embodiment, image feature information held by the image feature information holding unit 480 is observed by observing again the target object 15 which has been gripped successfully, at the transfer destination. However, observing the image feature information held by the image feature information holding unit 480 at the transfer destination is not always necessary. For example, during operation of the manipulator 12 for conveying the target object 15, the imaging device 14 may capture more than once images of the target object 15 gripped by the gripping apparatus 13. By capturing images in this manner, a region where the relative-position relationship does not change with respect to the gripping apparatus 13 is extracted as a region of the target object 15, and the image feature group in the region may be held in the image feature information holding unit 480.

Further, the imaging device 14 may capture an image before gripping of the target object 15, that is, in a state in which the target object 15 is present, and an image after the target object 15 is gripped and conveyed, that is, in a state in which the target object 15 does not exist. In this case, the two images are different in the region of the target object 15, but the other regions are the same in the images. Therefore, the different region between these two images can be made to be a region corresponding to the target object 15. In this manner, the region of the target object 15 in the image before conveyance can be specified and the image features in the specified region can be held in the image feature information holding unit 480.

Modification Example

In the modification of the fourth embodiment, image feature information is held by observing the target object 15 that has been gripped successfully. However, the gripped target object 15 may be observed so as to generate a model, and the target object 15 may be detected by using the generated model.

Note that the model here is a model for detecting the target object 15 from an image including the target object 15 and calculating the position and orientation. The model may be a template image of the successfully gripped target object 15 having been cut out or a two-dimensional geometric feature extracted from the cut-out image. When three-dimensional information can be used, the model may be a three-dimensional geometric feature or a three-dimensional mesh model reconstructed from distance information.

Figure 16:
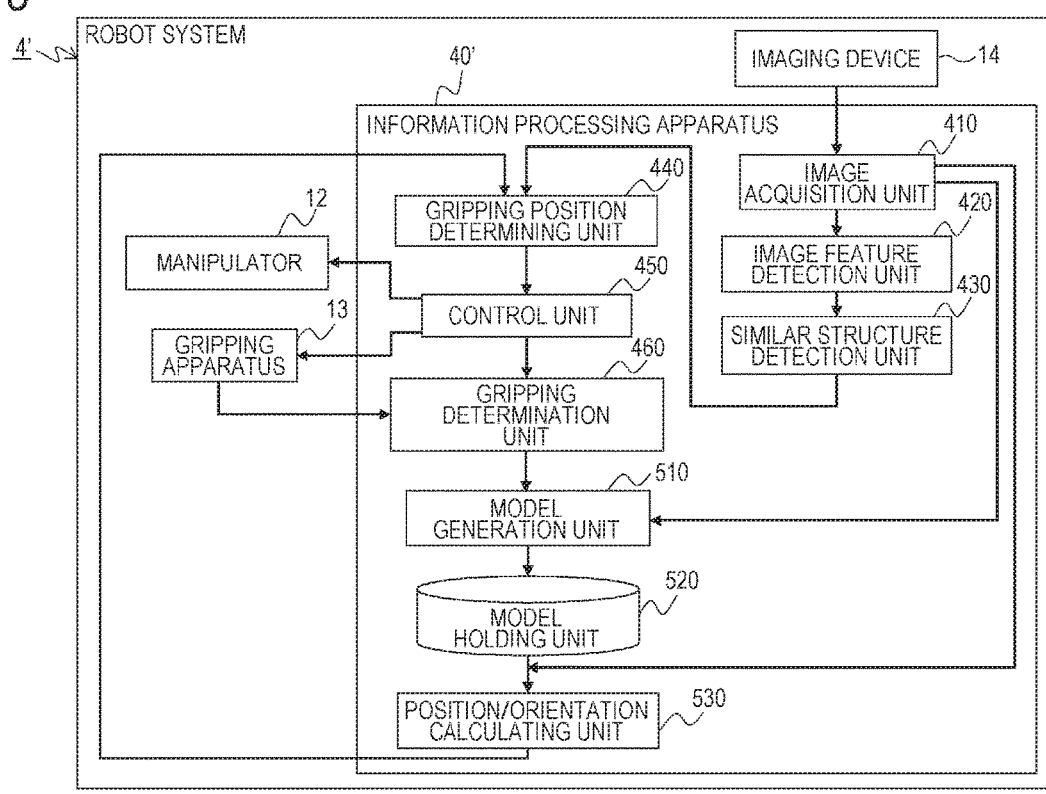
FIG. 16 is a functional block diagram of the robot system in a modification example.

FIG. 16 is a functional block diagram of a robot system 4' including the information processing apparatus 40' in a modification example for generating a model. In the information processing apparatus 40', a model generation unit 510, model holding unit 520, and position/orientation calculating unit 530 are added in addition to the configuration of the fourth embodiment. The gripping success information determined by the gripping determination unit 460 is input to the model generation unit 510, and the image of the target object 15 that has been successfully gripped is captured again by the imaging device 14, whereby a model is generated from the captured image and is output to the model holding unit 520.

The model holding unit 520 is a recording device that inputs and holds the model generated by the model generation unit 510 and outputs the held model to the position/orientation calculating unit 530. The model held by the model holding unit 520 is input to the position/orientation calculating unit 530, which detects the target object 15 from the image acquired by the image acquisition unit 410 and calculates the position and orientation of the target object 15.

The gripping position determining unit 440 determines the gripping position of the target object 15 based on the calculated position and orientation.

Figure 17:
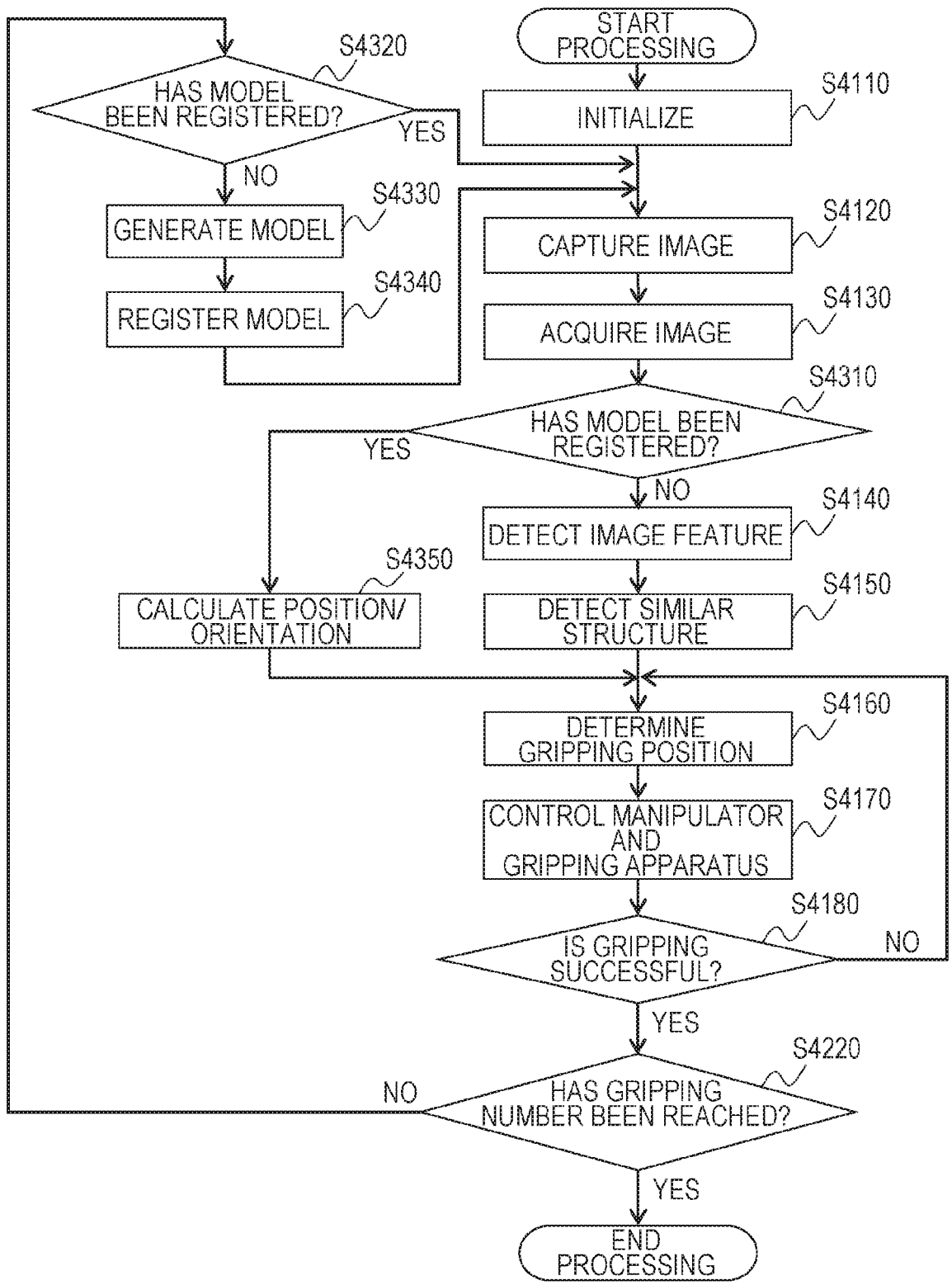
FIG. 17 is a flowchart showing processing executed in the robot system in the modification example.

FIG. 17 is a flowchart showing a processing procedure executed by the robot system 4' in the modification example. In this figure, in addition to the processing procedure of the fourth embodiment, a model registering completion determination (S4310 and S4320), model generation (S4330), model registration (S4340), and position and orientation calculation (S4350) are added. Since S4110 to S4180 are the same as the processing procedure of the fourth embodiment, the description thereof will be omitted.

In the modification example, the processing from S4110 to S4130 proceeds in the same manner as in the fourth embodiment. After S4130 is executed, the CPU 21 of the information processing apparatus 40' determines whether the model has been registered in the model holding unit 520 (S4310). When the registration has not been made (N in S4310), S4140 to S4220 are executed as in the fourth embodiment. When the registration has been made (Y in S4310), S4350 which will be described later is executed, and S4160 to S4220 are executed as in the fourth embodiment.

When it is determined in S4220 that the number of gripping motions has reached the processing threshold (Y in S4220), the processing is terminated. When it is determined that the predetermined threshold value has not been reached (N in S4220), whether the model has been registered is determined (S4220). When the model has been registered (Y in S4220), the image capturing step S4120 is executed again.

When the model has not been registered (N in S4220), model generation is performed (S4330), and the model generation unit 510 generates a model of the target object 15 in S4330.

To be specific, a region of the target object 15 that has been gripped successfully is extracted as a template from the captured image acquired by the image acquisition unit 410 to be used as a model. However, the model held by the model holding unit 520 may be a model made by calculating a two-dimensional feature amount from the template.

Alternatively, a three-dimensional model may be generated by capturing images of the target object 15 that has been gripped successfully, from multiple viewpoints and by performing three-dimensional restoration using stereo matching, and the generated three-dimensional model may be used as the model.

When the distance information can be obtained from the imaging device 14, the three-dimensional shape may be reconstructed from the obtained distance information. Alternatively, a mesh having neighboring lattice points as vertexes may be generated with the distance information as the distance value to the target arranged in the lattice shape, and may be used as the model.

In step S4340, the model generated by the model generation unit 510 is registered in the model holding unit 520, and S4120 is executed.

Whether the model holding unit 520 holds a model is determined in step S4310 after S4120 and S4130 are executed as in the fourth embodiment. When a model is not held (N in S4310), S4140 which is the image feature detecting step is executed as described above.

On the other hand, when a model is held, the position/orientation calculating unit 530 uses the model held by the model holding unit 520 to detect the target object 15 from the image acquired by the image acquisition unit 410 and to calculate the position and orientation (S4350).

As a method of detecting the object and calculating the position and orientation, to be specific, the position and orientation of the target object 15 is obtained using template matching when the model is a template. Further, when a two-dimensional feature amount is used as the model, the position and orientation of the target object 15 may be obtained using the Line2D method or feature point matching.

When the model is three-dimensional, the position and orientation, of the target object 15 may be calculated by using an algorithm such as iterative closest points (ICP).

In the modified example, a model is generated by observing the target object 15 that has been successfully gripped, on the basis of the similar structure, and the target object 15 is detected based on the generated model, whereby the position and orientation are calculated for determining the gripping position. However, as described with reference to S371 in FIG. 13 in the third embodiment, a model may be generated based on the region of the target object 15 calculated by moving the target object 15 before the gripping operation of the robot. Then, the target object 15 may be detected based on the calculated model, and the position and orientation may be calculated to determine the gripping position.

As described above, the following effects can be obtained in each embodiment.

In the first embodiment, the gripping position can be promptly and highly accurately determined without requiring time-consuming operations such as generation of a teaching model or a CAD model when the target object 15 is gripped by a robot or the like. Further, the target object 15 can be gripped even in a situation where the target objects 15 are aligned, that is, even in a situation where the feature repeatedly appears.

In the second embodiment, even when the gripping of the target object 15 fails, the target object 15 can be gripped by detecting a new similar structure pattern again and recalculating the gripping position of the robot.

In the third embodiment, when gripping of the target object 15 fails, the gripping position is changed to move the target object 15 by a minute distance and a displacement region corresponding to the target object 15 is obtained, whereby the gripping position is recalculated. As a result, the gripping position can be calculated more correctly.

In the fourth embodiment, the image feature detected from the target object 15 that has been successfully gripped is registered, and the calculation result of the similar structure is corrected using the registered image feature to obtain the image feature group. With this configuration, the gripping position can be calculated more correctly.

The image acquisition unit in the present disclosure is not particularly limited as long as an image made by capturing an image of the real space is input. For example, an image captured by a monocular camera may be input to the image acquisition unit, or a plurality of camera images such as those of a stereo camera may be input to the image acquisition unit. Also, the present disclosure is not limited to the input of a color image, and configuration may be made so as to input a grayscale image to the image acquisition unit or to input a depth image representing depth information to the image acquisition unit. Furthermore, a configuration may be made so that the image captured by the camera is directly input or input via a network.

In each embodiment, the image feature detection unit can use any image feature as long as the image feature detection unit can calculate the degree of similarity of the relative-position relationship and the feature amount between the two image features. The similar structure detection unit can detect a similar structure by using any method as long as the similar structure detection unit calculates a similar structure using image features. For example, a two-dimensional similar structure may be detected by using a feature amount of a two-dimensional image feature and a two-dimensional relative-position relationship, or a three-dimensional similar structure may be detected by using a feature amount of a three-dimensional image feature and a three-dimensional relative-position relationship. In addition, similar structure may be detected using only the relative-position relationship of image features. Further, the similar structure may be detected so as to avoid the gripping position where the gripping has failed in the past, or a structure similar to the image features of the target object 15 that has been successfully gripped in the past may be detected.

The similar structure means a structure in which the relative-position relationship of image features is similar. The relative-position relationship of image features means a distance in the image or a pair of distance and direction in the image. A plurality of image feature groups having a similar structure means a set of image features clustered such that the relative-position relationship is similar between image features included in each set of the image features after clustering.

The gripping position determining unit can determine the gripping position by any method as long as the unit calculates the position where the robot has a grip based on the similar structures. The gripping position may be the position of the center of gravity of the image feature group having the similar structures calculated by the similar structure detection unit, may be the position of the center of gravity of the convex surrounding area surrounding the image feature group, or may be the center of the inscribed circle of the area. Further, the flatness within the area may be obtained, and the position at which the flatness is high may be set as the gripping position.

In addition, priorities may be assigned to a plurality of gripping positions based on the calculation result of the similar structure. In the assigning, the gripping priority may be given to the gripping positions in descending order of the number of image features of the image feature group, or in descending order of the area of the region surrounding the image feature group, or alternatively in descending order of the degree of flatness around the gripping position.

The gripping includes the concept of grasping (grabbing or pinching with a plurality of fingers, for example) or holding (for example, using a vacuum suction pad or electromagnetic force).

The gripping position is a position at which the robot grips the target object 15 via the gripping apparatus 13 for example, and is a position on the target object 15 where gripping three is exerted on the target object 15.

The gripping position may be obtained from a two-dimensional gripping position in the input image. In addition, when a camera including two or more cameras can be used, the gripping position may be directly obtained as a three-dimensional position by using the depth value obtained by the stereo matching between the plurality of cameras using the relative-position information of the known cameras.

It should be noted that the present disclosure is not limited to the above-described embodiments, and can be implemented in various forms. For example, at least a part of the functions of the image acquisition unit, the image feature detection unit, and the like described in the embodiments is feasible by using a micro-processing unit (MPU). The functions are also feasible by using application specific integrated circuit (ASIC), system-on-a-chip (SoC), or the like.

According to the present disclosure, the gripping position can be promptly and highly accurately determined when a target object is gripped by a robot or the like.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (SD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-192626, filed Oct. 2, 2017, which is hereby incorporated by reference herein in its entirety.

What is claimed is:

1. An information processing apparatus comprising:
one or more processors programmed to cause the information processing apparatus to function as:
an image acquisition unit configured to acquire a captured image obtained by capturing an image of a target object to be gripped by a gripping device;
an image feature point detection unit configured to detect a plurality of image feature points in the captured image;
a generation unit configured to generate a plurality of groups of image feature points in which a distance and direction between respective image feature points appear repeatedly in common from the plurality of image feature points, wherein the plurality of groups of image feature points include a first group and a second group, wherein the image feature points included in the first group are similar in image feature to the image feature points included in the second group, and wherein the first group and the second group do not overlap with each other;
a similar structure detection unit configured to detect, from the captured image, a boundary of a group of image feature points, of the plurality of groups of image feature points, in the captured image acquired by the image acquisition unit, wherein detecting the boundary of the group of image feature points includes clustering the image feature points based on a feature of the image feature points; and
a gripping position determining unit configured to determine the gripping position at which the gripping device grips the target object based on the position of the boundary detected by the similar structure detection unit.

2. The information processing apparatus according to claim 1, wherein the similar structure detection unit detects the boundary of the group of image feature points by clustering the plurality of image feature points further based on the relative-position relationship of the image feature points.

3. The information processing apparatus according to claim 1, wherein the gripping position determining unit determines the gripping position further based on the group of image feature points.

4. The information processing apparatus according to claim 1, wherein the gripping position determining unit assigns priority order for gripping to a plurality of gripping positions.

5. The information processing apparatus according to claim 4, wherein
the gripping device is provided in a manipulator of a robot system having the manipulator, and
the information processing apparatus further comprises a control unit configured to control the manipulator.

6. The information processing apparatus according to claim 1, further comprising:
a display unit configured to display the group of image feature points or the gripping position for a user.

7. A method for processing information, the method comprising:
acquiring a captured image obtained by capturing an image of a target object to be gripped by a gripping device;
detecting a plurality of image feature points in the captured image;
generating a plurality of groups of image feature points in which a distance and direction between respective image feature points appear repeatedly in common from the plurality of image feature points, wherein the plurality of groups of image feature points include a first group and a second group, wherein the image feature points included in the first group are similar in image feature to the image feature points included in the second group, and wherein the first group and the second group do not overlap with each other;
detecting, from the captured image, a boundary of a group of image feature points, of the plurality of groups of image feature points, in the acquired captured image, wherein detecting the boundary of the group of image feature points includes clustering the image feature points based on a feature of the image feature points; and
determining the gripping position at which the gripping device grips the target object based on the position of the detected boundary.

8. A robot system comprising:
an imaging device configured to capture an image of a target object; and
an information processing apparatus, wherein
the information processing apparatus comprises one or more processors programmed to cause the information processing apparatus to function as:
an image acquisition unit configured to acquire a captured image obtained by capturing the image of a target object to be gripped by a gripping device from the imaging device;
an image feature point detection unit configured to detect a plurality of image feature points in the captured image;
a generation unit configured to generate a plurality of groups of image feature points in which a distance and direction between respective image feature points appear repeatedly in common from the plurality of image feature points, wherein the plurality of groups of image feature points include a first group and a second group, wherein the image feature points included in the first group are similar in image feature to the image feature points included in the second group, and wherein the first group and the second group do not overlap with each other;
a similar structure detection unit configured to detect, from the captured image, a boundary of a group of image feature points, of the plurality of groups of image feature points, in the captured image acquired by the image acquisition unit, wherein detecting the boundary of the group of image feature points includes clustering the image feature points based on a feature of the image feature points; and
a gripping position determining unit configured to determine the gripping position at which the gripping device grips the target object based on the position of the boundary detected by the similar structure detection unit.

9. The robot system according to claim 8, further comprising the gripping device.

10. The robot system according to claim 9, further comprising a manipulator, wherein
the gripping device is provided in the manipulator, and
the information processing apparatus further comprises a control unit configured to control an orientation of the manipulator.

* * * * *